(12) United States Patent
Thomas et al.

(10) Patent No.: US 6,826,240 B1
(45) Date of Patent: Nov. 30, 2004

(54) METHOD AND DEVICE FOR MULTI-USER CHANNEL ESTIMATION

(75) Inventors: Timothy A. Thomas, Palatine, IL (US); Frederick W. Vook, Schaumburg, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/526,003

(22) Filed: Mar. 15, 2000

(51) Int. Cl.[7] .............................................. H04L 27/06
(52) U.S. Cl. ................................. 375/340; 375/347
(58) Field of Search ................................. 375/260, 267, 375/316, 340, 347; 342/165; 370/210, 347

(56) References Cited

PUBLICATIONS

Ye (Geoffrey) Li, Senior Member, IEEE, Nambirajan Seshadri, Senior Member, IEEE, and Sirikiat Ariyavisitakul, Senior Member, IEEE; "Channel Estimation for OFDM Systems with Transmitter Diversity in Mobile Wireless Channels"; IEEE Journal on Selected Areas in Communications, vol. 17, No. 3, Mar. 1999, pp. 461–471.

Georgios B. Giannakis, Fellow, IEEE, and Cihan Tepedelenlioglu: "Basis Expansion Models and Diversity Techniques for Blind Identification and Equalization of Time–Varying Channels"; Proceedings of the IEEE, vol. 86, No. 10, Oct. 1998, pp. 1969–1986.

Ove Edfors, Magnus Sandell, Jan–Jaap van de Beek, Sarah Kate Wilson, Per Ola Borjesson; "Analysis of DFT–based channel estimators for OFDM*", presented in part at the 1995 Vehicular Technology Conference (VTC'96) in Chicago, IL, Jul. 25–28, 1995, pp. 815–819.

A.J. Paulraj and Boon Chong Ng; "Space–Time Modems for Wireless Personal Communications"; IEEE Personal Communications; Feb. 1998, pp. 36–48.

H. Sari, G. Karam, and I. Jeanclaude; "Transmission Techniques for Digital Terrestrial TV Broadcasting"; IEEE Communications Magazine, Feb. 1995; pp. 100–109.

Martin V Clark, Senior Member, IEEE; "Adaptive Frequency–Domain Equalization and Diversity Combining from Broadband Wireless Communications"; IEEE Journal on Selected Areas in Communications, vol. 16, No. 8, Oct. 1998; pp. 1385–1395.

Timothy A. Thomas, Fred W. Vook, and Kevin L. Baum; "Least–Squares Multi–User Frequency–Domain Channel Estimation for Broadband Wireless Communications Systems".

Primary Examiner—Don N. Vo
(74) Attorney, Agent, or Firm—Kenneth A. Haas

(57) ABSTRACT

A receiving device and method for operating a communication system is provided. The receiving device receives a predetermined pilot sequence. The received pilot sequence is converted into at least one frequency domain pilot sequence. A plurality of time invariant channel estimates are determined from the frequency domain pilot sequence. The pilot sequence may include a null cyclic prefix. A time variant channel estimate may be determined from the time invariant channel estimates.

53 Claims, 12 Drawing Sheets

METHOD AND DEVICE FOR MULTI-USER CHANNEL ESTIMATION

FIELD OF THE INVENTION

The present invention generally relates to the field of communication systems and more particularly, to estimating the time and frequency response of at least one desired signal received by at least one antenna while incorporating Doppler induced variations. Furthermore, the present invention relates to computing weights for the purpose of weighting and summing at least one receive antenna in a communication receiver, and relates to estimating the transmitted data.

BACKGROUND OF THE INVENTION

In a wireless communication system, a major design challenge is to maximize system capacity and performance in the presence of interference, and a time-varying multipath channel. Multipath propagation is caused by the transmitted signal reflecting off objects near the transmitter and receiver and arriving at the receiver over multiple paths. Interference in a communication system can come from a variety of sources depending on the particular system deployment. If the system is in motion, then Doppler induced Inter-Carrier Interference (ICI) becomes an issue. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number $L_p$ of propagation paths, where each path has an associated time delay and complex gain. In such a channel, the communication receiver receives the superposition of $L_p$ delayed, attenuated, and phase-shifted copies of the transmitted signal. The number of paths $L_p$ and their time delays and phase shifts depends on the physical location of the various scattering objects (such as buildings, automobiles, and trees) in the immediate vicinity of the transmitter and receiver. The complex attenuation (magnitude and phase) of each path depends on the length of each path, as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. This signal duplication causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In a mobile wireless communication system, the complex attenuation of each of the multipath components of the received signal becomes a time-varying function of the transmitter's path and speed throughout the scattering field local to the transmitter's position. The transmitter's motion causes the received signal strength at a particular portion of the occupied bandwidth to vary as time progresses. In a mobile multipath channel, the overall channel response not only varies across the occupied bandwidth of the signal, but also across time as well.

In addition to multipath, interference is another system component that limits the performance of a communication system.

If the system is deployed in an unlicensed band, then other users of the band can generate interference. And in a cellular system employing frequency reuse, transmitters in another cell that is allocated the same set of frequency channels can generate co-channel interference. Frequency reuse is the practice of assigning the same frequency channels to multiple users of the allocated spectrum.

Many cellular communication systems employ the technique of frequency reuse in order to maximize the utilization of the frequency spectrum allocated to a wide-area system deployment. In a cellular system, a large geographical area is divided into smaller regions called cells, where each cell is served by a single base station operating on an assigned set of frequency channels. Within each cell, multiple subscriber devices are allowed to communicate with the base station on the frequency channels assigned to that cell. The concept of frequency reuse involves allocating different sets of frequency channels to the cells belonging to a particular group and then reusing the same sets of frequencies to the cells belonging to another group of cells.

The reuse factor of a cellular system is defined to be the minimum distance between two cells that are allocated the same set of frequency channels divided by the radius of a cell. A cellular system employing a large reuse factor does not utilize the allocated spectrum as efficiently as a cellular system employing a smaller reuse factor. However, the level of co-channel interference received by a receiver in the cellular system is directly dependent on the reuse factor. Reducing the reuse factor tends to increase the level of co-channel interference experienced by a receiver. To better utilize the available spectrum, it would be advantageous to be able to suppress the effects of co-channel interference.

To suppress co-channel interference and equalize the received signals, it is in many cases necessary to estimate and track the time-varying frequency response of the propagation channel. Algorithms known in the art that do not adequately track the time-varying frequency response of the received signal will exhibit poor interference suppression performance and poor equalization performance.

Another technique for increasing the utilization of the frequency spectrum in a wireless communication system is to allocate multiple subscriber devices within a cell to the same time-frequency resources at the same time. Such a technique is known in the art as Spatial Division Multiple Access (SDMA). Many algorithms known in the art that are designed to enable SDMA must be capable of tracking the subscriber devices' time-frequency variations that are caused by a time-varying multipath channel. Failure to track these variations will reduce the ability of the receiver to demodulate the signals transmitted by the multiple subscriber devices. Thus, there is a need for a method and device for estimating the time and frequency response of at least one transmitted signal received on at least one receive antenna. In addition, there is a need for a method and device for combining the outputs of at least one receive antenna in the presence of severe time variations in the channel response for the purposes of estimating the transmitted data.

DETAILED DESCRIPTION OF A PREFERRED EMBODIMENT

Figure 1:
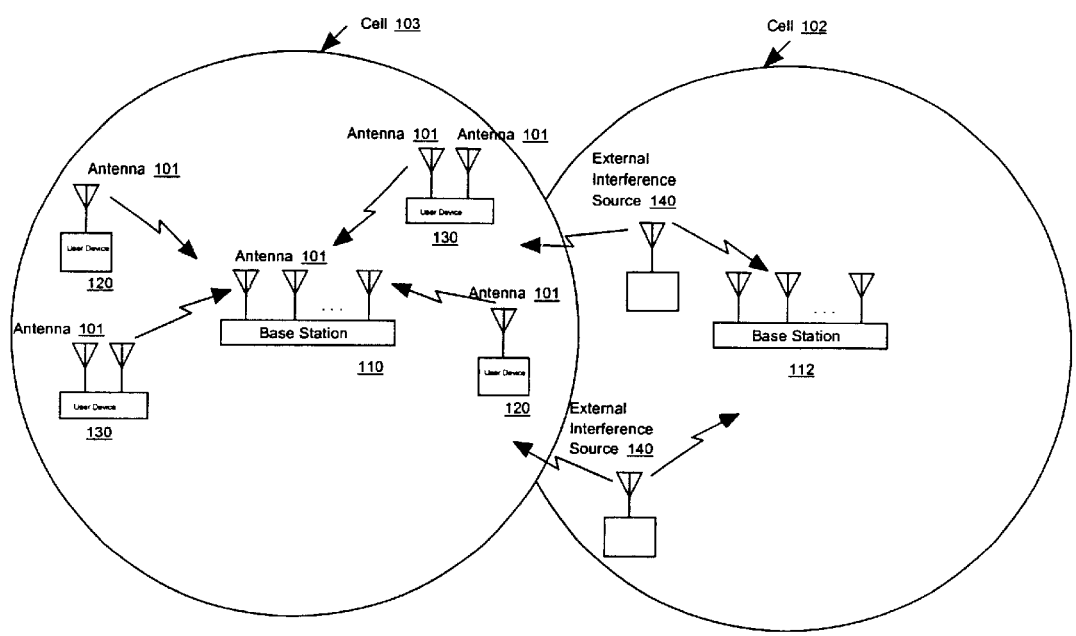
FIG. 1 is an overview diagram of a preferred embodiment of a cellular communication system in accordance with the present invention.

An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, while it operates in response to changes in the propagation environment. While operating, the adaptive antenna attempts to maximize the reception of the signal received from a desired transmitting device, as it simultaneously minimizes the effects of all other interfering signals and noise. In a communication system, the interference suppression capability of an adaptive antenna array offers the potential to reduce co-channel interference, compensate for inter-carrier interference, improve coverage quality, and increase overall system capacity.

Adaptive antenna arrays also offer the possibility of providing a new way of multiplexing multiple devices: Spatial Division Multiple Access (SDMA). With SDMA, multiple devices can simultaneously share the same channel (i.e., time, frequency, or code channel) and are separated and simultaneously decoded by the receiver array on the basis of their spatial position relative to the antenna array. When successfully deployed, SDMA promises to provide enormous increases in system capacity.

Spatial Division Multiple Access is a difficult technology to implement because of the rapidly varying multipath fading channel. In an SDMA system, the devices that are sharing a channel provide interference to the receiver processing algorithms that must decode the signals transmitted by the devices. When a receiver-processing algorithm attempts to decode one SDMA device, the other SDMA devices provide strong interference to the decoding algorithm. The adaptive antenna implementing SDMA suppresses the effects of the other devices when attempting to decode one of the transmitting devices.

A problem associated with employing both an equalizer and an adaptive antenna in a wireless communication system lies in the design of an algorithm and device having adequate ability to adapt to changes in the signal environment.

Adaptive antennas that operate in a fast-fading multipath environment must adapt to the rapidly varying channel as well as to any changes in the nature of the desired and interfering signals. In a broadband system, a frequency-selective multipath channel will cause significant variations in the channel across the occupied bandwidth of the received signal. Equalization and interference-suppression algorithms, which cannot track these channel variations both in time and frequency, will suffer significant degradation in performance as measured by the Bit-Error Rate (BER) or Signal-to-Interference-plus-Noise Ratio (SINR). A common ingredient in many equalizers and adaptive antenna arrays is an algorithm and device that estimates the characteristics of the multipath propagation environment, channel transfer function, or channel frequency response, between the desired transmitting device and each of the at least one receiving antenna at the communication receiver. When SDMA is being employed in a broadband system operating in a frequency-selective environment, then an adaptive antenna array generally requires an estimate of the channel frequency response between each receiving antenna and each of the transmitting devices that are simultaneously sending information to the array. The channel estimation algorithm in this case should operate to simultaneously solve for the channel responses of the multiple transmitting devices. Performing a simultaneous estimate of the channel responses of multiple transmitting devices is a difficult operation in a mobile broadband communication system operating in a multipath-rich environment with high frequency selectivity. Strong interference caused by an SDMA deployment, Doppler induced Inter-Carrier Interference (ICI), or a low reuse may factor cause even more difficulty to the channel estimation algorithms. It would therefore be advantageous for a device to be able to compute an accurate channel frequency response estimate in the presence of SDMA interference, Inter-Symbol Interference (ISI), inter-Carrier interference, and co-channel interference. It would also be advantageous for a device to be able to track any variations in the channel frequency response of multiple mobile users whose channel responses will vary as the users move.

Given the need for higher system capacities in wireless communication systems, adaptive antennas and advanced equalization techniques are important for satisfying the ever-increasing need for high data rate communications. To support the operation of adaptive antennas and equalizers, it is advantageous to have a method and device that tracks the time-varying frequency response of a broadband system accurately enough to permit effective equalization and interference suppression. Given the difficulties associated with implementing SDMA and the deleterious nature of the multipath-fading environment, such a device would enable improved equalization and interference suppression performance in a mobile broadband communication system.

The present invention includes a method and device for calculating the channel frequency responses of the signals transmitted by at least one transmitting device and received on at least one receive antenna. The method and device of the present invention also provides for an adaptive antenna combining algorithm for the purposes of jointly equalizing the received signals, while simultaneously suppressing interference in a communication receiver, in order to recover the information transmitted by the device(s). In a highly frequency-selective mobile propagation channel, the ability to accurately track the variations in the channel response over both the time and frequency dimensions may be critical to the proper operation of any equalization or interference suppression algorithm.

This invention may perform channel estimation for one or more users on a time varying channel for communication systems with null cyclic prefixes, thus accounting for Doppler induced variations.

In order for adaptive antenna combining algorithms to be able to equalize a desired user's signal and/or suppress interference in a mobile wideband digital communication system, the channels of all signals must be accurately tracked across frequency and in time. The method and device in this invention may be used to estimate the channel responses on each receive antenna for multiple users in the presence of Doppler induced time variations and frequency selectivity. In addition, the method and device in this invention presents new adaptive antenna frequency-domain combining algorithms for use in a time-varying frequency-selective channel. These new combining algorithms compensate for rapid variations in the channel response and can even compensate for severe channel variations within a data block, where a data block is a group of received time-domain symbols that are transformed into the frequency domain (e.g., with a Discrete Fourier Transform or DFT).

The method and device of the present invention may be incorporated into a communications receiving device, base station, or subscriber unit. In the present invention, the term "device" can refer to any type of communications device such as a base station, subscriber unit, or other communications receiver or transmitter.

The present invention may be implemented in a communication system where at least one desired transmitting device transmits information to a communication receiver having at least one antenna. In one embodiment, pluralities of transmitting devices simultaneously transmit information to a communication receiver having a plurality of antennas. A transmitting device transmits its information in bursts that contain two components: a training interval and a data interval. The information transmitted in a training interval contains pilot symbol sequences of content and duration known by both the transmitting device and the communication receiver. A Null Cyclic Prefix may be included in the training and data intervals. The data interval contains data symbols that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

In a communication system, the present invention provides an improved technique for computing a channel transfer function (also referred to as "estimating the frequency response," or "computing a set of frequency-domain channel gains") of the propagation channel between each of the at least one transmitting device and each of the at least one receiving antenna. The frequency response estimates can then be used to equalize the received signals so that a demodulating device at the communication receiver can recover the data symbols transmitted by the transmitting devices. The method and device of the present invention provides for a means of weighting and summing the outputs of at least one receive antenna to simultaneously receive and recover the information transmitted simultaneously by at least one transmitting device. Also if more than one antenna is present at the communication receiver, then the method and device of the present invention can be used to enable an adaptive antenna to mitigating the effects of unwanted interference transmitted by other users of the occupied bandwidth, as well as motion induced interference, and intersymbol interference.

The method and device in accordance with the present invention provide accurate estimates of the channel frequency responses of the plurality of transmitting devices even in the case where multiple transmitting devices transmit information simultaneously on the same time-frequency channel. In such a situation, the presence of multiple devices transmitting simultaneously provides a level of interference that will prevent a conventional receiver from simultaneously estimating the channel of all transmitting devices. However, the present invention provides for incorporating the effects of each of the interfering devices so that all of the channel responses of the transmitting devices can be jointly and accurately estimated.

The ability to receive and recover the information transmitted simultaneously by more than one device significantly increases the capacity of the communication system. Conventional cellular systems permit only one device to transmit on a particular frequency channel within a cell for any predetermined time interval. Providing for more than one device to transmit to a base station on the same frequency channel at the same time will multiply the capacity of the system by a factor equal to the number of devices that are allowed to simultaneously transmit. Devices incorporating algorithms for providing this capability must have the ability to track any variations in the time and frequency-selective channel. The method and device of the present invention provide excellent channel response tracking as well as increase the data block size, making communication systems more efficient.

A preferred embodiment of the present invention described below typically operates in a time-varying delay-spread channel and operates under the assumption that the channel can change significantly over the occupied bandwidth and significantly in time.

One limiting factor to the implementation of a channel estimator in broadband communications is Inter-Symbol Interference (ISI), which can cause severe frequency selectivity. Equalizing or suppressing interference in a broadband channel with traditional time-domain techniques becomes a complex problem when the channel length becomes much larger than the symbol time.

As a result, Orthogonal Frequency Division Multiplexing (OFDM) and frequency-domain equalization techniques have been proposed to combat the high level of ISI that is typical in broadband channels.

An additional problem occurs when the end-users are mobile. The speed of the mobiles causes significant time variations necessitating the tracking of the channel. Many solutions to this problem require initial channel estimations with pilots, and then tracking the channel either in a decision directed fashion or by using a tracking algorithm. The problem with these techniques is that there is an inherent lag in tracking the channel. The device and method of the current invention provide channel estimates at each time sample without the lag problem. Other estimation techniques assume the channel does not vary across the time interval during which a block of samples are DFT'd (Discrete Fourier Transform) into the frequency domain. The channel estimation technique of the device and method of the current invention have the ability to track the channel variations even across a baud/time block.

If interference suppression is desired along with equalization, then adaptive antenna signal processing can be used. In a broadband wireless communication system, adaptive antennas promise to increase system performance and capacity by suppressing interference and providing a diversity gain for equalization. Furthermore, adaptive antennas can increase capacity through Spatial Division Multiple Access (SDMA), where multiple transmitting devices share the same time-frequency channel and are separated on the basis of their spatial channel responses. However, for best performance, the adaptive antenna-combining algorithm must be able to track the channels of both the desired and interference signals across both time and frequency. Failure to accurately track the channel variations in either time or frequency will result in poor performance. The device and method of the current invention utilizes a frequency-domain multi-user channel estimation technique for tracking the time and frequency variations of multiple SDMA users sharing the same time-frequency channel. The estimation method models the time-varying channel with multiple time invariant Doppler channels as described in FIG. 8.

FIG. 1, numeral 100, illustrates a wireless communication system in accordance with the preferred embodiment of the present invention. As shown in FIG. 1, a Base Station 110 provides communication service to a geographic region known as a cell 103. At least one User Devices 120 and 130 communicate with the Base Station 110. In some embodiments of the communication system of FIG. 1, at least zero External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature and number of the External Interference Sources 140 will depend on the specific embodiment of the communication system of FIG. 1. In some cases, as is shown in FIG. 1, an External Interference Source will be another User Device 140 (similar in construction and purpose to User Device 120) that is communicating with another Base Station 112 in the same frequency spectrum allocated to Base Station 110 and User Devices 120 and 130. As shown in FIG. 1, User Devices 120 has a single antenna, while User Devices 130 have at least one antenna. The method and device of the present invention can be implemented as part of a Base Station 110 as well as part of a User Device 120 or 130.

Figure 2:
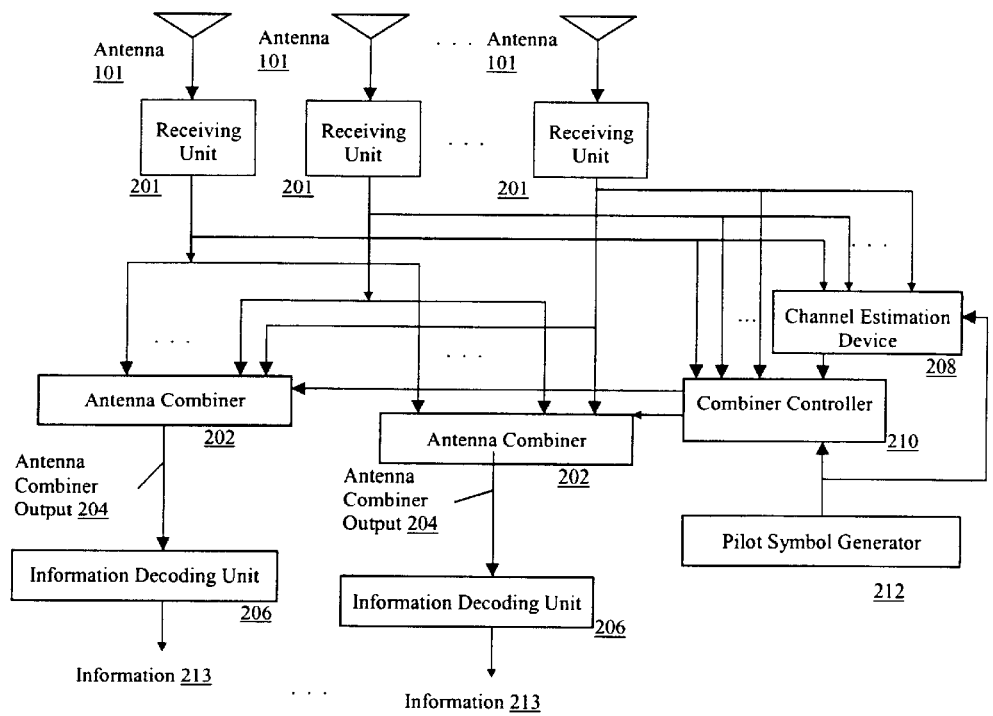
FIG. 2 is a block diagram illustrating a preferred embodiment of a device in accordance with the present invention.

FIG. 2, numeral 200, is a block diagram illustrating a device in accordance with the present invention. The communication receiver in accordance with the present invention includes at least one antenna (101) wherein the outputs of the antennas are each provided to a receiving unit (201). The outputs of the receiving units (201) are provided to at least one Antenna Combiner (202). The signals from the receiving units (201) are also fed into the Combiner Controller (210), which regulates the operation of the at least one Antenna Combiner (202). The signals from the receiving units (201) are also fed into the Channel Estimation Device (208). The Pilot Symbol Generator (212) generates pilot symbol information that is used by the Combiner Controller (210) to control the Antenna Combiner (202). The pilot symbol information generated by the Pilot Symbol Generator (212) is also used by the Channel Estimation Device (208) to estimate the time-varying frequency responses of the transmitting devices (110, 112, 120, 130, or 140, or any combination thereof). The output of an Antenna Combiner (202) is fed into an Information Decoding Unit (206), which decodes the Antenna Combiner Output (204) and generates data information (213) that was received by the Antennas (101).

Figure 3:
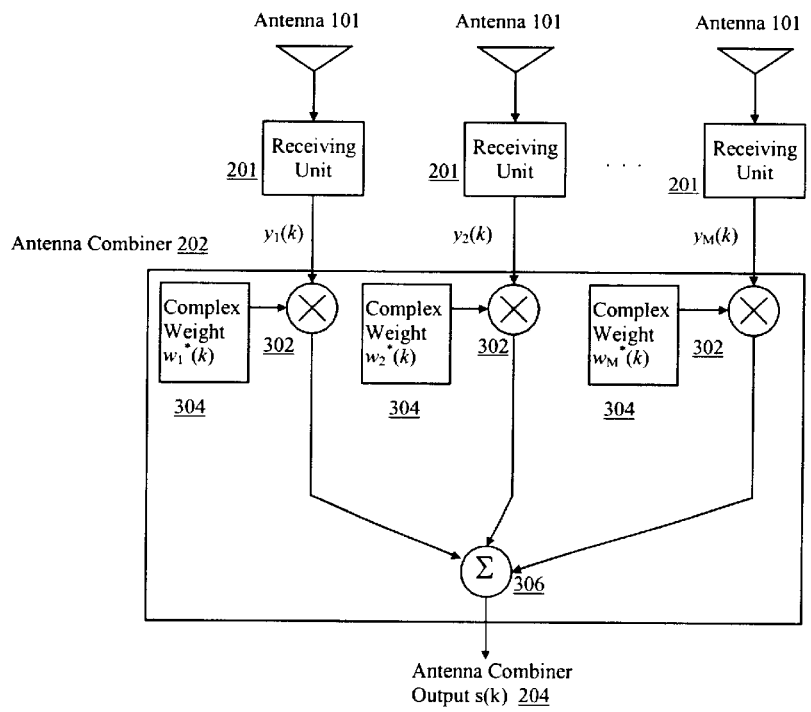
FIG. 3 is a block diagram illustrating details of the Antenna Combiner of the device of FIG. 2.

FIG. 3, numeral 300, is a block diagram illustrating details of the Antenna Combiner of the device of FIG. 2. Antenna Combiner (202) is coupled to the receiving units (201), which in turn are coupled to the antennas (101). In a preferred embodiment, the receiving units (201) may include radio frequency pre-amplifiers, filters, and other devices that can be used to convert the radio frequency signal received by the antenna down to a digital stream of baseband equivalent complex symbols. As shown in FIG. 2, the output of the i'th receiving unit (201) (where i is an integer between 1 and M inclusive, and M is the total number of antenna elements) is mathematically denoted by $y_i(k)$, where k and i are integers, and is provided to the antenna combiner (202) which can be in the form of a plurality of complex multipliers (302) which multiply the output of each receiving unit (201) by a complex weight (304), mathematically denoted as $w_i(k)$, and a combiner (306) sums the outputs of the plurality of complex multipliers (302). The values of the complex weights (304) are controlled by the Combiner Controller (210), shown in FIG. 2, which are described in more detail below.

Figure 4:
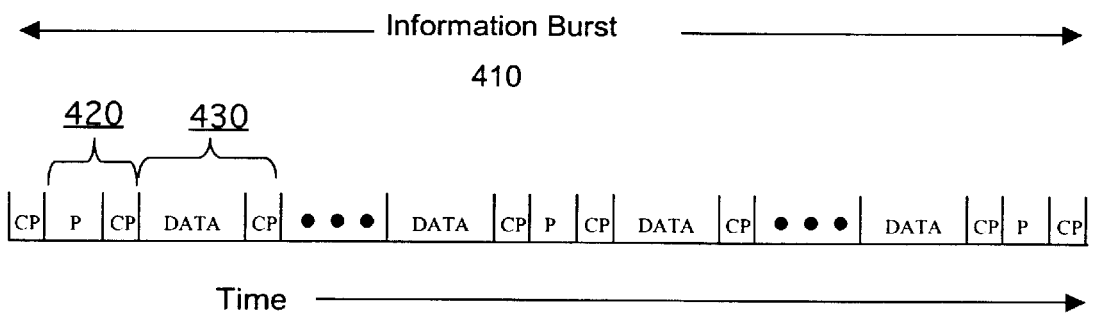
FIG. 4 is a representation of an information burst for Single Carrier Modulation, which can be used by the communication system in which the device in FIG. 2 operates.

FIG. 4, numeral 400, is a timing diagram illustrating the structure of an information burst for a single carrier modulation (410) transmitted between a plurality of transmitting devices (e.g., Base station 110, User Device 120, or 130) and a receiving device (e.g., Base station 110, User Device 120, or 130). An information burst (410) includes at least one training interval (420) and at least one data interval (430). During a training interval (420), a transmitting device (e.g., a Base station 110, or a User Device 120, or a User Device 130, or a base station 112, or in some cases a User Device 140, or any combination thereof) transmit training information consisting of at least one pilot symbol of duration, content, and timing known to both the transmitting device and the receiving device (a Base station 110, or a User Device 120, or a User Device 130). As will be discussed below, the Channel Estimation Device (208) in the present invention uses the outputs of the receiving units (201) during at least one of the training intervals (420) and the knowledge of the transmitted sequence of pilot symbols to compute an estimate of the channel time and frequency response between the plurality of transmitting devices (a Base station 110 or 112, or a User Device 120, 130, or 140, or any combination thereof) and the antennas (101) of the receiving device.

The present invention introduces the use of null cyclic prefixes. A description of the null cyclic prefix single-carrier communication system is now given. Each pilot block (denoted P in the figure) and data block is surrounded by $L_{CP}$ zeros that are the null cyclic prefixes/postfixes (denoted CP in the figure). $L_{CP}$ must encompass the length (measured in the number of received samples) of the multipath channel and the tails of the single-carrier pulse waveform. In a preferred embodiment, note that the null cyclic prefix of one block is the null postfix of the previous block which helps reduce overhead. Each pilot block consists of $L_P$ known symbols and the $N_P=(L_P+L_{CP})$ symbols that are DFT'd into the frequency domain consist of the pilot symbols plus their corresponding null cyclic postfix. Between any two pilot blocks there is any number of data blocks.

Each data block consists of K unknown symbols and the $N=(K+L_{CP})$ symbols that are DFT'd into the frequency domain consist of the data symbols plus their corresponding null cyclic postfix.

The data received on a pilot or data block on a M element antenna array will be denoted by the vector y(n,b) and will consist of the sum of the $L_P$ pilot or K data symbols for each user plus the null cyclic postfixes convolved with the corresponding time-varying channels. Therefore the number of symbols in y(n,b) will vary depending on if block b is a pilot block or data block. In other words, if block b is a pilot block, then n varies between 0 and $N_P-1$ and if block b is a data block, then n varies between 0 and N−1.

The absolute time that each block starts is very important because the Doppler signal for user u, $z_{u,v}(n,b)$ depends on the absolute time. Therefore we define $n_b$ to be the time that a particular block starts. In a preferred embodiment, b=1 is a pilot block and $n_1=0$, b=2 is a data block and $n_2=N_P$, b=3 is also a data block and $n_3=N_P+N$, and so forth. The Doppler signal on block b for user u, $z_{u,v}(n,b)$ is given as:

$$z_{u,v}(n,b) = x_u(n,b) e^{j2\pi v(n+n_b)/N_k}$$

where $x_u(n,b)$ is user u's time-domain symbols on block b and n varies between 0 and $N_P-1$ (N−1) if b is a pilot (data) block. Because of the null cyclic prefixes on each data block, the received M×1 frequency-domain signal vector can be expressed as:

$$Y(k, b) = \sum_{u=1}^{U} \sum_{v=-V}^{+V} H_{u,v}(k) Z_{u,v}(k, b) + N(k, b)$$

where k is the subcarrier number (k varies between 0 and $N_P-1$ (N−1) if b is a pilot (data) block), U is the number of known users, N(k,b) is the DFT of the noise on block b, $H_{u,v}(k)$ is given as:

$$H_{u,v}(k) = \sum_{l=0}^{L-1} h_{u,v}(l) e^{-j2\pi kl/N}$$

and for data block b, $Z_{u,v}(k,b)$ is given as:

$$Z_{u,v}(k, b) = \sum_{n=0}^{K-1} z_{u,v}(n, b) e^{-j2\pi kn/N}$$

Figure 5:
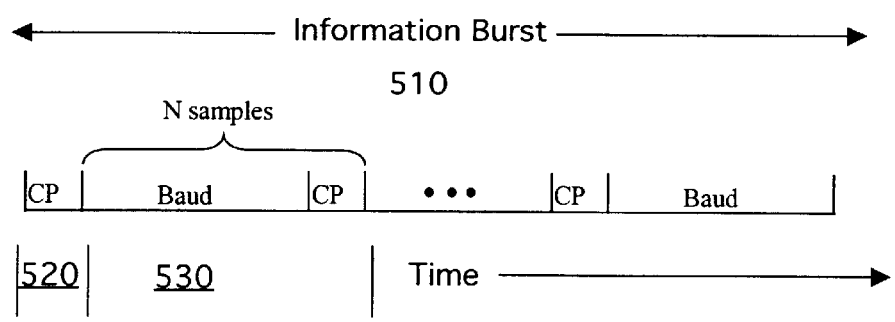
FIG. 5 is a representation of an information burst for Multi-carrier Modulation, which can be used by the communication system in which the device in FIG. 2 operates.

FIG. 5, numeral 500 is a timing diagram illustrating the structure of a Null Cyclic Prefix Data/Pilot Burst or information burst for Multi-carrier modulation (510) transmitted between a plurality of transmitting devices (e.g., Base station 110, User Device 120, or 130) and a receiving device (e.g., Base station 110, User Device 120, or 130). This information burst acts in accordance with the following definition for frequency-domain time-varying channel estimation for communication systems employing null cyclic prefixes. It is known that a cyclic prefix is useful in OFDM to simplify equalization and allow for perfect FIR equalization (in the absence of channel nulls that exactly coincide with a subcarrier) of a time invariant single-input single-output FIR channel when there is no noise and interference. It also is known that a cyclic prefix is useful in single carrier broadband communications to enable the use of efficient frequency domain equalization. However when Doppler induced channel variations are accounted for, the cyclic prefix property is no longer valid due to the channel changing over the DFT block size. When the channel changes over the DFT block, the channel no longer appears to be circular, which eliminates the advantage of using a cyclic prefix. To counteract this effect, we propose using a null cyclic prefix as described below. One advantage of a null cyclic prefix for a single carrier or multi-carrier communication link is that it will force a cyclic prefix property on the Doppler signals. The Doppler signal is defined as the Doppler sinusoid (numeral 710 in FIG. 7) times the transmitted signal (numeral 730 in FIG. 7). The time-domain slot structure for a preferred embodiment of the null cyclic prefix is shown in FIG. 4 for single carrier modulation. It is shown here for a block of $N_p-L_{cp}$ pilot symbols and $N_d-L_{cp}$ data symbols where $L_{cp}$ is the null cyclic prefix length, $N_p$ is the DFT size for the pilot symbols, and $N_d$ is the DFT size for the data symbols. The slot structure for a preferred embodiment of an OFDM or multicarrier implementation is shown in FIG. 5. The OFDM or multicarrier baud with any time domain pulse shaping (e.g., raised cosine roll off) and without a cyclic prefix is sent where indicated by the data or pilot slot. The total length of the OFDM baud is $N_p-L_{cp}$. It should be noted that in the frequency-domain in OFDM, the pilots can be mixed in with the data. Also the OFDM baud does not need a regular cyclic prefix because all of the equalization will be done prior to its DFT demodulator.

The basic idea behind the frequency-domain channel estimation with null cyclic prefixes is the observation that each of the time-domain Doppler signals are being transmitted through a RF multipath Doppler channel with some maximum time delay spread. Because of the null cyclic prefix at the beginning of each DFT block, linear convolution with each multipath Doppler channel becomes circular convolution with the same channel. This means that in the frequency-domain the DFT of each Doppler signal is multiplied by the DFT (of size N if the DFT block is a data block; of size $N_p$ if the DFT block is a pilot block) of its corresponding RF multipath channel. Thus to estimate each Doppler channel, we propose to estimate L time taps that parameterize the frequency-domain channel (where a logical choice for L is the number of sample times needed to encompass the maximum expected multipath delay).

Figure 6:
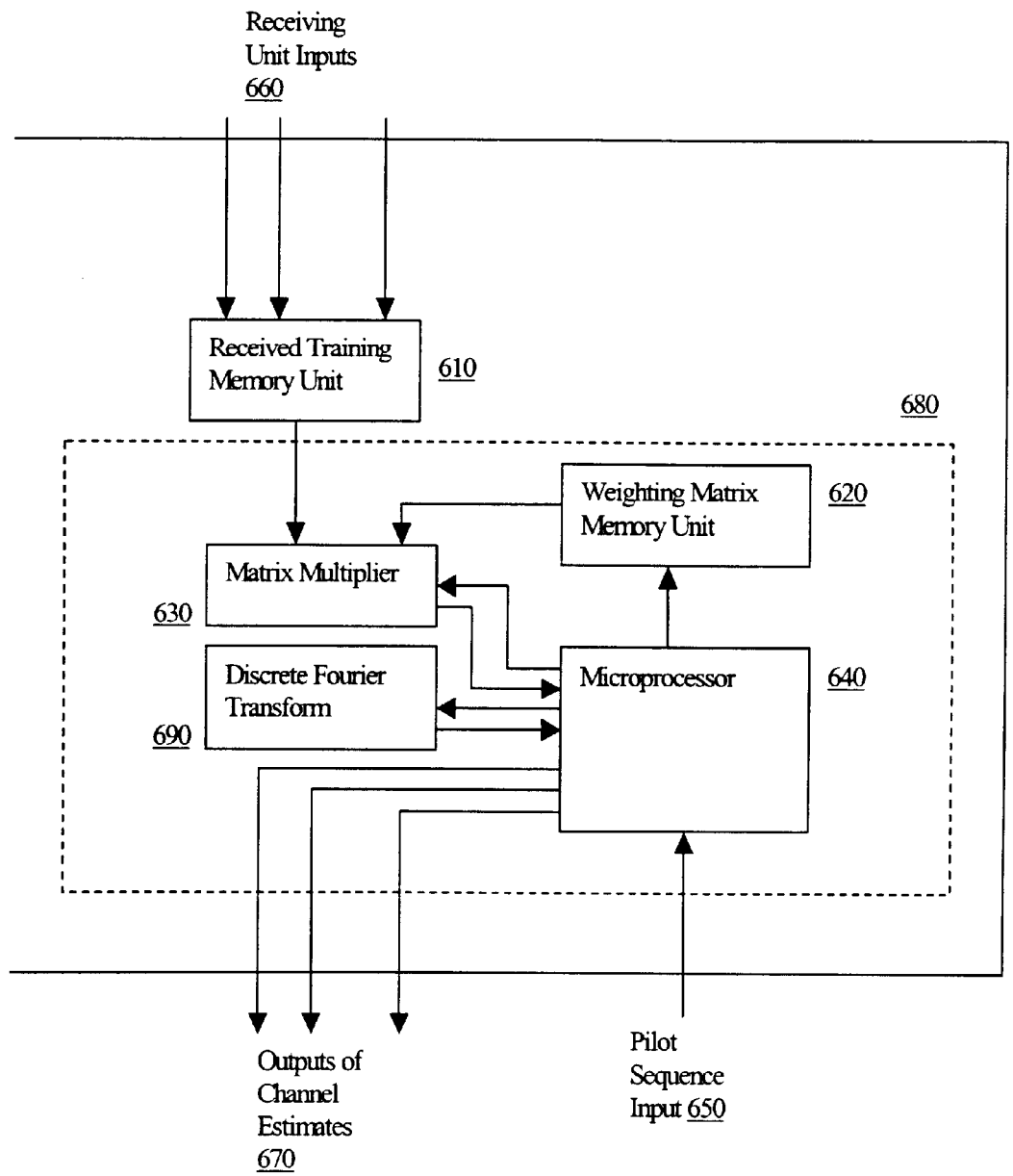
FIG. 6 is a block diagram illustrating details of the Channel Estimation Device of the device of FIG. 2.

FIG. 6, numeral 600, is a block diagram illustrating details of the Channel Estimation Device (208) of the device of FIG. 2. A preferred embodiment of the Channel Estimation Device (208) includes a Received Training Memory unit (610), which stores the output signals from the Receiving Units (201) that were collected during at least one of the training intervals (420). A microprocessor (640) collects the pilot sequence information from the Pilot Sequence Input (650) and computes a weighing matrix to be stored in a Weighting Matrix Memory Unit (620). The process by which the Matrix of Filtering Coefficients is computed by the Microprocessor (640) will be described below. The received data stored in the Received Training Memory Unit 610 and the Matrix of Weighting Coefficients stored in the Weighting Matrix Memory Unit (620) are fed into a Matrix Multiplier (630) where they are multiplied, according to a process to be described below, to form the estimates of the channel response between the plurality of transmitting devices (a Base station 110, 112, or a User Device 120, 130, 140, or any combination thereof) and the receiving antennas (101) on the receiving device (a Base station 110, 112, or a User Device 120, 130, or 140). It is to be noted that the Weighting Matrix Memory Unit 620, the Matrix Multiplier (630), and the Microprocessor (640) are implemented in a processor (680). In another embodiment of the present invention, the Microprocessor (640) takes the output of the matrix multiplier and feeds the result to the Fast Fourier Transform Device (690), the output of which is used by the Microprocessor (640) in the process of computing the channel gains between the plurality of transmitting devices.

An embodiment for the present invention is a communications receiving device, base station, or subscriber unit operating in either a single carrier or a multicarrier communication system such as Orthogonal Frequency Division Multiplexing (OFDM). The present invention can also be embodied in a communication receiving device, base station, or subscriber unit operating in a communication system employing direct sequence spread spectrum signaling.

In both multicarrier (such as OFDM) and single carrier systems, information burst (410) can be referred to as a time-frequency slot.

Figure 7:
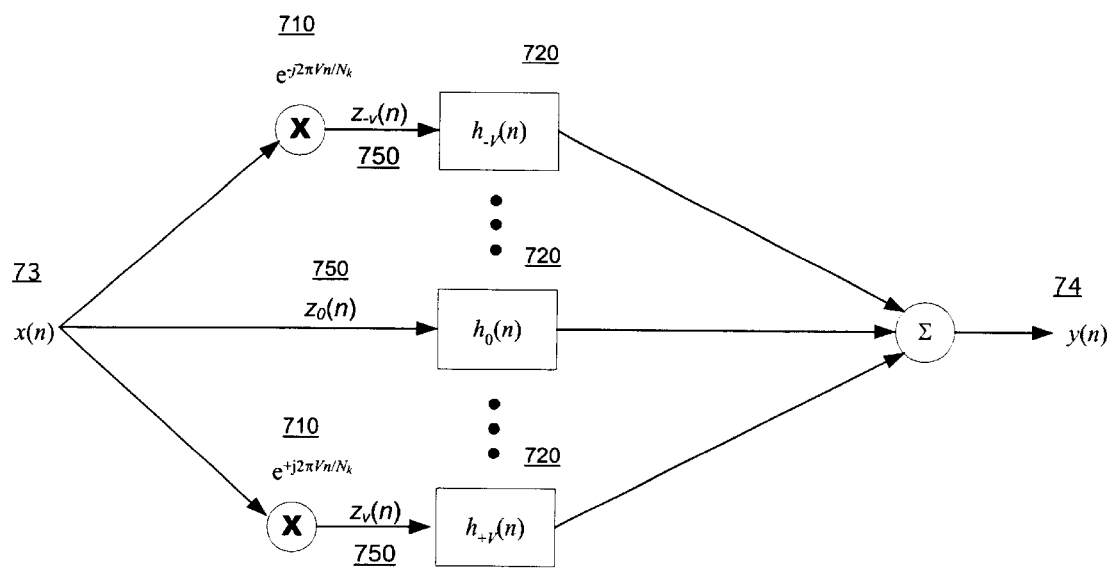
FIG. 7 is a representation of a time invariant channel model for a single-input single-output time varying channel.

FIG. 7, numeral 700, is a representation of the Time Invariant Channel Model for a single input single output time varying channel. FIG. 7 shows a diagram of the time-varying channel model. FIG. 7 shows the structure of the model for the time-varying impulse response h(l,n), where/is the index of the differential delay of the impulse response, and n is the time sample number. The output from a single transmitter, x(n) (730) is sent through a time-varying channel with L taps and the received signal at a single receive antenna is y(n) (740). The output of the time-varying channel (740) can be adequately modeled as the sum of the convolution of $V_T=(2V+1)$ "Doppler channels" (720), $h_v(n)$ (v=-V, . . . +V) with x(n) (730) times the corresponding Doppler sinusoid $e^{-j2\pi vn/N_k}$ (710). In equation form, y(n) is:

$$y(n) = \sum_{v=-V}^{+V} h_v(n) * (x(n)e^{j2\pi vn/N_k}) + n(n) \quad (1)$$

$$= \sum_{v=-V}^{V} h_v(n) * z_v(n) + n(n)$$

where the "Doppler signal", $z_v(n)$ (750), is $z_v(n)=x(n)e^{j2\pi vn/N_k}$ and * indicates linear convolution. The value of $N_k$ is fairly arbitrary but the channel produced by this channel model will repeat over the data block unless $N_k$ is greater than the total length of the received data block that is processed. Thus in a preferred embodiment, $N_k$ is chosen to be twice the size of the data block.

It can be shown that the time-varying channel, h(l,n) (FIG. 7) (l=0 . . . L−1) at any time n can be expressed as:

$$h(l, n) = \sum_{v=-V}^{+V} h_v(n) e^{-j2\pi vl/N_k} e^{j2\pi vn/N_k} \quad (2)$$

Because $N_k>>L$, $e^{-j2\pi vl/N_k} \approx 1$, equation (2) becomes:

$$h(l, n) \approx \sum_{v=-V}^{+V} h_v(n) e^{j2\pi vn/N_k} \quad (3)$$

It is clear from (1) and (3) that for communication systems with regular cyclic prefixes (e.g., OFDM), the time-varying channel destroys the cyclic prefix property. In other words, in time-varying channels the cyclic prefix portion of the data block is convolved with a different channel than the last portion of the data block. This causes Inter-Carrier Interference (ICI), which interferes with the proper demodulation of the received data. To avoid this problem, we propose sending all zeros as both the cyclic prefix and postfix for all data blocks (this is referred to as null cyclic prefixes). This makes the Doppler signal, $z_v(n)$, in (1) have a cyclic prefix property because the Doppler sinusoid is multiplied by zeros before and after a block of data symbols. Thus ICI is eliminated in equation (1) when the appropriate data block is DFT'd into the frequency-domain and when the true time-varying channel is adequately modeled with the elements of FIG. 7.

Figure 8:
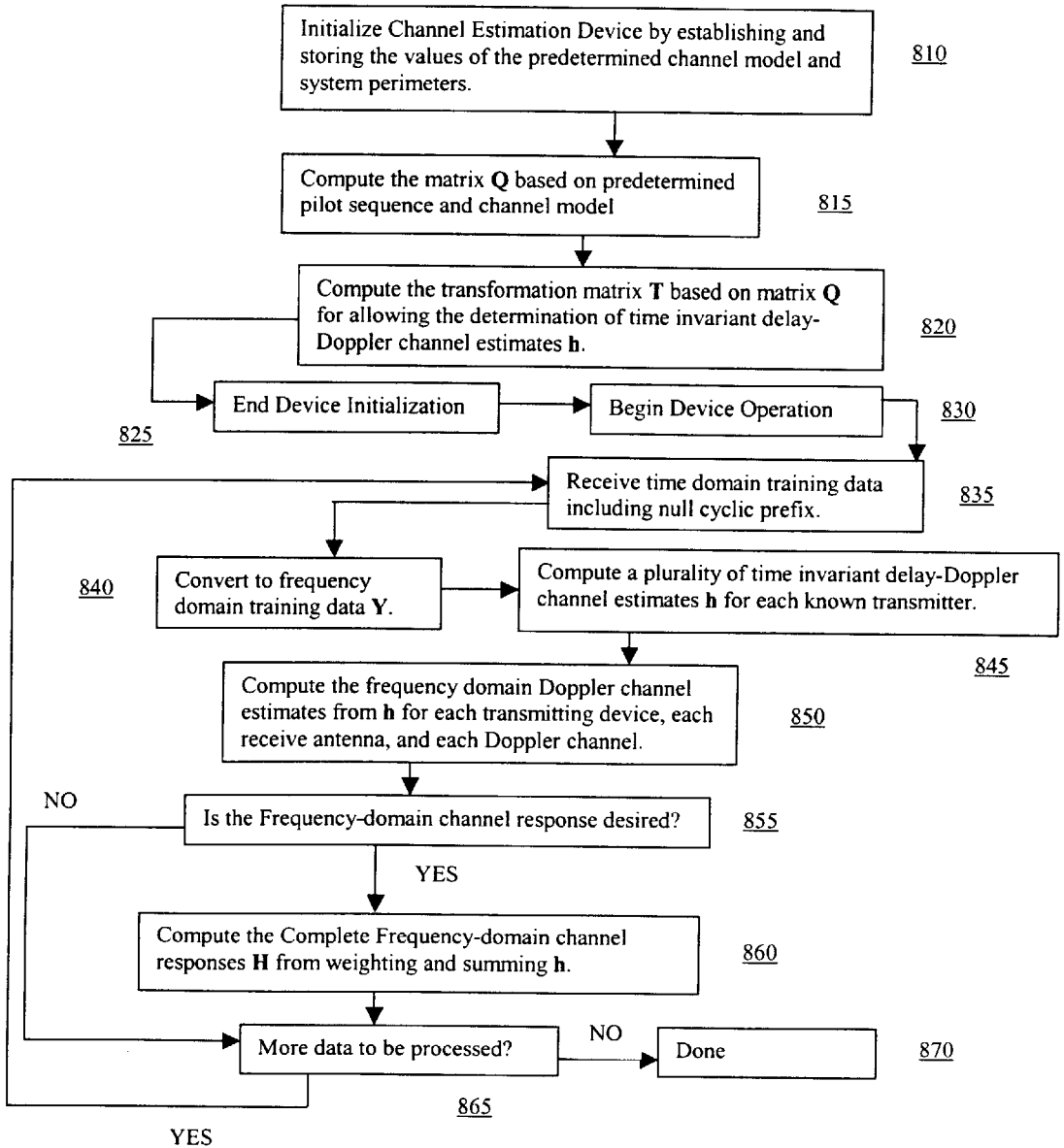
FIG. 8 is a flow chart representation of one embodiment of the method performed by the Channel Estimation Device of FIG. 6 to provide channel estimation between a transmitting device and a receiving antenna in accordance with the present invention.

FIG. 8 shows a flow chart that illustrates the steps performed by the Channel Estimation Device (208) in accordance with the present invention in the first embodiment in which null cyclic prefixes are employed. The methodology employed by this invention is defined as follows: Frequency-Domain Time-Varying Channel Estimation for Communication Systems Employing Null Cyclic Prefixes.

Assume there are U SDMA users, $V_T=(2V+1)$ (−V, . . . , 0, . . . , +V) Doppler signals and channels for each of the U SDMA users (and any number of unknown interferers). The first step is to estimate each SDMA user's $V_T$ Doppler channel vectors on each subcarrier at each antenna and stack them into a M×1 vector $H_{u,v}(k)$ (also known as the steering vector for the $u^{th}$ user's $v^{th}$ Doppler channel at the $k^{th}$ subcarrier). Note that although this is modeling a time varying channel, each Doppler channel estimate is time invariant. Before giving the estimation problem, the notation will be described. An arbitrary pilot time-frequency slot format is assumed, so the M×1 received signal vector in the frequency-domain, Y(k,b), is indexed by subcarrier, k, and time block number, b. In the following equations $Y_m(k,b)$ will refer to the $m^{th}$ antenna element of Y(k,b). $N_b$ is the total number of time blocks in the symbol burst and $\Gamma_b$ is the set of subcarriers where there is a pilot symbol on time block b. Let $Z_{u,v}(k,b)$ represent SDMA user u's $v^{th}$ Doppler channel pilot symbol (i.e., $Z_{u,v}(k,b)$ is the N-point DFT of $x_u(n,b)$ on time block b times the $v^{th}$ Doppler sinusoid). User u's $v^{th}$ Doppler channel on antenna m is parameterized by L time-domain taps (where L is chosen to be the largest expected multipath delay for all users):

$$H_{m,u,v}(k) = \sum_{n=0}^{L-1} h_{m,u,v}(n) e^{-j2\pi kn/N} \quad (4)$$

where N is the DFT size, k is the subcarrier number, and $h_{m,u,v}(n)$ is user u's $v^{th}$ Doppler channel tap on antenna m at time n. In single carrier, N=K, whereas in OFDM, N is chosen to be greater than K because the channel at subcarrier k=1 is not highly correlated with the channel at subcarrier k=K. A different $H_{m,u,v}(k)$ is found on each antenna for user u and then stacked in the vector $H_{u,v}(k)$ to get the steering vector at subcarrier k for Doppler channel v.

The estimation of the $v^{th}$ Doppler channel on the $m^{th}$ antenna is found by solving the following equation $$\min_{\substack{h_{m,t,v}(n) \\ t=1\ldots U \\ n=0\ldots L-1}} \sum_{b=1}^{N_b} \sum_{k \in \Gamma_b} \left| \sum_{u=1}^{U} \sum_{v=-V}^{V} H_{m,u,v}(k) Z_{u,v}(k,b) - Y_m(k,b) \right|^2 \quad (5)$$

Substituting in Equation (4), Equation (5) becomes:

$$\min_{\substack{h_{m,t,v}(n) \\ t=1\ldots U \\ n=0\ldots L-1}} \sum_{b=1}^{N_b} \sum_{k \in \Gamma_b} \left| \sum_{u=1}^{U} \sum_{v=-V}^{V} Z_{u,v}(k,b) \sum_{n=0}^{L-1} h_{m,u,v}(n) e^{-j2\pi kn/N} - Y_m(k,b) \right|^2 \quad (6)$$

The estimation problem is solved for the $h_{m,u,v}(n)$'s by matching in a least squares sense the known transmitted pilot symbols to the received data. The problem can be reformulated in a vector/matrix fashion as follows:

$$\min_{h_m} \sum_{b=1}^{N_b} \sum_{k \in \Gamma_b} |q^H(k) X(k,b) h_m - Y_m(k,b)|^2 \quad (7)$$

$$= \min_{h_m} |Q h_m - \Psi_m|^2 \quad (8)$$

where:

$h_m = [h_{m,1,-V}(0), \ldots, h_{m,1,-V}(L-1), \ldots, h_{m,1,V}(0), \ldots,$
$h_{m,1,V}(L-1), h_{m,2,-V}(0), \ldots, h_{m,2,-V}(L-1), \ldots,$
$h_{m,U,-V}(0), \ldots, h_{m,U,-V}(L-1), \ldots, h_{m,U,V}(0), \ldots,$
$h_{m,U,V}(L-1)]^T$, $$\Psi_m = \begin{bmatrix} Y_m(\Gamma_{1,\min}, 1) \\ \vdots \\ Y_m(\Gamma_{1,\max}, 1) \\ Y_m(\Gamma_{2,\min}, 2) \\ \vdots \\ Y_m(\Gamma_{2,\max}, 2) \\ \vdots \\ Y_m(\Gamma_{N_b,\min}, N_b) \\ \vdots \\ Y_m(\Gamma_{N_b,\max}, N_b) \end{bmatrix} Q = \begin{bmatrix} q^H(\Gamma_{1,\min}) X(\Gamma_{1,\min}, 1) \\ \vdots \\ q^H(\Gamma_{1,\max}) X(\Gamma_{1,\max}, 1) \\ q^H(\Gamma_{2,\min}) X(\Gamma_{2,\min}, 2) \\ \vdots \\ q^H(\Gamma_{2,\max}) X(\Gamma_{2,\max}, 2) \\ \vdots \\ q^H(\Gamma_{N_b,\min}) X(\Gamma_{N_b,\min}, N_b) \\ \vdots \\ q^H(\Gamma_{N_b,\max}) X(\Gamma_{N_b,\max}, N_b) \end{bmatrix} \quad (9)$$

$$q(k) = \begin{bmatrix} f(k) \\ f(k) \\ \vdots \\ f(k) \end{bmatrix} \} UV_T f(k)'s, \quad f(k) = \begin{bmatrix} 1 \\ e^{j2\pi k/N} \\ \vdots \\ e^{j2\pi(L-1)k/N} \end{bmatrix} \quad (10)$$

-continued $$X(k,b) = diag\{Z_{1,-V}(k,b)1^T, \ldots, Z_{1,V}(k,b)1^T, Z_{2,-V}(k,b)1^T, \quad (14)$$
$$\ldots, Z_{2,V}(k,b)1^T, \ldots, Z_{U,-V}(k,b)1^T, \ldots,$$
$$Z_{U,V}(k,b)1^T\}$$

For these equations, $h_m$ is $UV_T L \times 1$, Q is $N_T \times UV_T L$ (a first matrix), q(k) is $UV_T L \times 1$, f(k) is $L \times 1$, X(k,b) is $UV_T L \times UV_T L$, $\Psi_m$ is a $N_T \times 1$ matrix of received frequency-time samples, 1 is a $L \times 1$ vector of all ones, $N_T$ is number of training symbols in the symbol burst, $N_b$ is the number of time blocks in a burst, $\Gamma_{b,min}$ is the smallest frequency in the set $\Gamma_b$, and $\Gamma_{b,max}$ is the largest frequency in the set $\Gamma_b$.

The solution to this minimization problem is:

$$h_m = (Q^H Q)^{-1} Q^H \Psi_m \quad (11)$$

Once the time weights for each user and Doppler channel are found, they can be converted back to the frequency-domain channel estimate at subcarrier k and time block b by first using the equation $$h_i(l,n) = \sum_{v=-V}^{+V} h_{i,v}(l) e^{j2\pi vn/N_k}$$

to get the time-domain channel at baud/time block b and then performing an DFT. Note that if $\Psi = [\Psi_1, \Psi_2, \ldots \Psi_M]$ and $h = [h_1, h_2, \ldots h_M]$, then the solution can be written as:

$$h = T\Psi \quad (12)$$

where $T = (Q^H Q)^{-1} Q^H$ $UV_T L \times N_T$ (a second matrix).

Another embodiment of the present invention computes the time invariant and time-varying channel estimates according to the following mathematical steps. Each user's Doppler channels is modeled as the DFT of L time-taps (which encompass the expected length of the channel plus the "tails" of the pulse waveform) as follows:

$$(M \times 1) H_{u,v}(k) = \sum_{l=0}^{L-1} h_{u,v}(l) e^{-j2\pi kl/N_p} \quad (13)$$

The goal of the frequency-domain Doppler channel estimation is reduced to finding the time-domain Doppler channels for each user, $h_{u,v}(l)$. We assume that we have P pilot blocks $b = p_1 \ldots p_p$ and the Doppler channel estimates are the solution to the following least-squares problem:

$$\min_{h} |Qh - Y|^2 \quad (14)$$

where $(PN_P \times UV^T L)$ Q, $(UV_T L \times M)$ h and $(PN_P \times M)$ Y are:

$$Q = \begin{bmatrix} Q_1 \\ \vdots \\ Q_P \end{bmatrix}, Q_b \begin{bmatrix} q^H(1) X(1, p_b) \\ \vdots \\ q^H(N_p) X(N_p, p_b) \end{bmatrix} \quad (15)$$

$$q(k) = \begin{bmatrix} f(k) \\ \vdots \\ f(k) \end{bmatrix} \} UV_T f(k)'s \quad (16)$$

$$f(k) = \begin{bmatrix} 1 & e^{-j2\pi k/N_p} & \ldots & e^{-j2\pi k(L-1)/N_p} \end{bmatrix}^T \quad (17)$$

-continued $$X(k, b) = diag(Z_{1,-V}(k, b)1^T, \ldots ,$$
$$Z_{1,+V}(k, b)1^T, \ldots , Z_{U,+V}(k, b)1^T, \ldots , Z_{U,+V}(k, b)1^T) \quad (18)$$

1 is an (L×1) vector of all ones, $$h = [H_I \ldots H_U]^T \quad (19)$$

$$H_U = [h_{u,-V}(0), \ldots , h_{u,-V}(L-1), \ldots , h_{u,+V}(0), \ldots , h_{u,+V}(L-1)] \quad (20)$$

$$Y = \begin{bmatrix} Y_1 \\ \vdots \\ Y_p \end{bmatrix}, Y_b \begin{bmatrix} Y^T(1, p_b) \\ \vdots \\ Y^T(N_p, p_b) \end{bmatrix} \quad (21)$$

The solution to equation (14) is:

$$h = (Q^H Q)^{-1} Q^H Y \quad (22)$$

Note that, for this derivation, $T=(Q^H Q)^{-1} Q^H$ and depends only on pilot data and thus can be computed once and stored. From h we can find the frequency-domain Doppler channels at the data blocks as the N-point DFT of the time domain Doppler channels.

Once these estimates are found, they can be used in a variety of fashions to suppress interference and equalize the desired signal(s). The description of some possible combining weights for this system is given for FIG. 10.

The first step in FIG. 8, block 810, is to initialize Channel Estimation Device (208) of the device of FIG. 2 by establishing and storing the values of the pilot sequences that are assigned to the transmitting devices, the number of Doppler taps $V_T$ and the number of Delay taps L in the channel model, the system DFT size (N for data blocks, $N_p$ for pilot blocks), and the Doppler DFT size ($N_k$). Next, in block 815, process the matrix Q (a first matrix) based on predetermined pilot sequence from block 810, and the delay Doppler channel parameters h' into the uncorrupted received array data Y', according to Y'=Qh', in accordance with the delay-Doppler channel model. Q is computed based on the pilot sequences that are assigned to the transmitting devices, the number of Doppler taps and the number of delay taps in the channel model, the system DFT size, and the Doppler DFT size. Next, in block 820, compute the transformation matrix T (a second matrix) that transforms the received data matrix Y' into a set of delay-Doppler channel parameters h' according to h'=TY' such that h' minimizes the expression $|Qh'-Y'|^2$. In a preferred embodiment, the transformation matrix T is computed according to $T=(Q^H Q)^{-1} Q^H$. Flow proceeds to block 825, wherein the device is finished with the steps required to initialize the channel estimation device. Next, in block 830, normal operating mode commences, and the device proceeds to block 835, wherein the receiver receives data over an information burst and passes the data along to block 840 to be collected and converted into a matrix of received training data Y. Preferably in the embodiment shown, the information burst contains a pilot sequence which includes a null cyclic prefix. Next, in block 845, compute the delay-Doppler channel estimates h for each desired transmitter at each antenna output by multiplying the matrix of received data by the transformation matrix: h=TY. Next, in block 850, using the equation $$H_{m,u,v}(k) = \sum_{n=0}^{L-1} h_{m,u,v}(n) e^{-j2\pi kn/N}$$

compute the estimated frequency domain channel estimates for each transmitting device, for each receive antenna, and each Doppler channel by taking the DFT of the delay-spread taps that correspond to the transmitting device, the receiving antenna, and the Doppler channel being considered. This equation is defined where N is the DFT size, k is the subcarrier number, and $h_{m,u,v}(n)$ is user u's $v^{th}$ Doppler channel tap on antenna m at time n. A different $H^{m,u,v}(k)$ is found on each antenna for user u and then stacked in the vector $H^{u,v}(k)$ to get the steering vector at subcarrier k for Doppler channel v. Proceed to block 855 and determine if this is the complete Frequency-domain channel response desired. Then, in a preferred embodiment, in block 860, using the formula $$H_u(k, n) = \sum_{v=-V}^{+V} H_{u,v}(k) e^{j2\pi vn/N_k},$$

compute the Complete Frequency-domain channel responses by weighting and summing the corresponding frequency domain channel estimates for each transmitting device, each receive antenna, and each Doppler channel. If desired, the time-domain channel estimate, $h_u(l,n)$, can be found for all times by parameterizing it by $V_T$ time invariant channels, $h_{u,v}(l)$, referred to as Doppler channels, and $$h_u(l, n) = \sum_{v=-V}^{+V} h_{u,v}(l) e^{j2\pi vn/N_k}.$$

Next block 865 asks is there more data to be processed? If yes, proceed to block 835. If no, block 870, the process has been completed.

A second embodiment of the present invention for channel estimation provides for time varying channel estimates in communication systems employing regular cyclic prefixes or no cyclic prefixes. Frequency-domain time-varying channel estimation for communication systems employing regular cyclic prefixes or no cyclic prefixes are now detailed. The derivation of the channel estimation for regular or no cyclic prefixes is as follows. Let $x_i(m,b)$ be the time-domain training for user i on OFDM baud b (or time block b in single carrier). In terms of the frequency-domain training on baud b, the time-domain training is:

$$x_i(m, b) = \frac{1}{N} \sum_{k \in \Gamma_b} X_i(k, b) e^{j2\pi km/N} \quad (23)$$

where $\Gamma_b$ is the set of subcarriers on baud (time) b where there is a pilot (for single carrier this would be subcarriers 0, 1, ... N−1). In Equation (23), $X_i(k,b)$ is the frequency-domain training. In order to estimate the Doppler channels the training must be multiplied by a time-varying Doppler sinusoid (see FIG. 7). This gives $V_T$ training signals per user at baud/time block b and is designated as $z_{i,v}(m,b)$ and has the following form:

$$z_{i,v}(m,b) = x_i(m,b) e^{j2\pi v(m+m_b)/N_k} \quad (24)$$

where $m_b$ is defined as the sample time at the beginning of baud/time block b. It is clear from Equation (24) that even if $x_i(m,b)$ has a cyclic prefix, the Doppler training signals $z_{i,b}(v,m)$ will have a Doppler corrupted cyclic prefix unless $v=0$ (DC). This means that there will be Inter-Carrier Interference (ICI) on the training for significant Doppler time variations. In order to best estimate the channels, the ICI must be accounted for as is done in the following channel estimation.

Let $y(m,b)$ be the received time-domain signal on baud/time block b.

Ignoring noise and assuming all SDMA users transmit their pilots on the same time-frequency slot, the received training has the following form:

$$y(m,b) = \sum_{i=1}^{U} \sum_{v=-V}^{+V} \sum_{l=0}^{L-1} h_{i,v}(l) z_{i,v}(m-l, b) \quad (25)$$

Taking the DFT of $y(m,b)$ at $m=m_b$ to $m_b+N-1$, the received training in the frequency-domain has the following form:

$$Y(k,b) = \sum_{i=1}^{U} \sum_{v=-V}^{+V} \sum_{l=0}^{L-1} h_{i,v}(l) Z_{i,v}(k, b, l) \quad (26)$$

where $Z_{i,v}(k,b,l)$ is given as:

$$Z_{i,v}(k, b, l) = \sum_{m=0}^{N-1} z_{i,v}(m-l, b) e^{-j2\pi km/N} \quad (27)$$

In matrix form, Equation (26) becomes:

$$Y^T(k,b) = x^{k,bT} h \quad (28)$$

where $x^{k,b}$ ($V_T UL \times 1$) and $h$ ($V_T UL \times M$) are given as:

$$x_{k,b} = \begin{bmatrix} x_{1,k,b} \\ \vdots \\ x_{U,k,b} \end{bmatrix} \quad h = \begin{bmatrix} H_1 \\ \vdots \\ H_j \end{bmatrix} \quad (29)$$

where $X_{i,k,b}$ ($V_T L \times 1$) and $H_i$ ($V_T L \times M$) are given as:

$$x_{i,k,b} = \begin{bmatrix} Z_{i,-V}(k, b, 0) \\ \vdots \\ Z_{i,-V}(k, b, L-1) \\ \vdots \\ Z_{i,+V}(k, b, 0) \\ \vdots \\ Z_{i,+V}(k, b, L-1) \end{bmatrix} \quad H_i = \begin{bmatrix} h^T_{i,-V}(0) \\ \vdots \\ h^T_{i,-V}(L-1) \\ \vdots \\ h^T_{i,+V}(0) \\ \vdots \\ h^T_{i,+V}(L-1) \end{bmatrix} \quad (30)$$

Stacking $Y(k,b)$ for each training symbol into a $N_T \times M$ matrix, $Y$, ($N_T$ is the total number of training symbols) we get the following equation:

$$Y = Xh \quad (31)$$

where Y and X ($N_T \times V_T UL$) (a first matrix) are given as:

$$Y = \begin{bmatrix} Y^T(\Gamma_{1,\min}, 1) \\ \vdots \\ Y^T(\Gamma_{1,\max}, 1) \\ \vdots \\ Y^T(\Gamma_{N_b,\min}, N_b) \\ \vdots \\ Y^T(\Gamma_{N_b,\max}, N_b) \end{bmatrix} \quad X = \begin{bmatrix} x^T_{\Gamma_{1,\min},1} \\ \vdots \\ x^T_{\Gamma_{1,\max},1} \\ \vdots \\ x^T_{\Gamma_{N_b,\min},N_b} \\ \vdots \\ x^T_{\Gamma_{N_b,\max},N_b} \end{bmatrix} \quad (32)$$

Solving Equation (31) in the least squares sense gives the following solution:

$$h = (X^H X)^{-1} X^H Y$$

Note that this finds the time-domain Doppler channels. If frequency-domain estimates are desired, the time-domain channel estimates can be DFT'd into the frequency domain.

Figure 9:
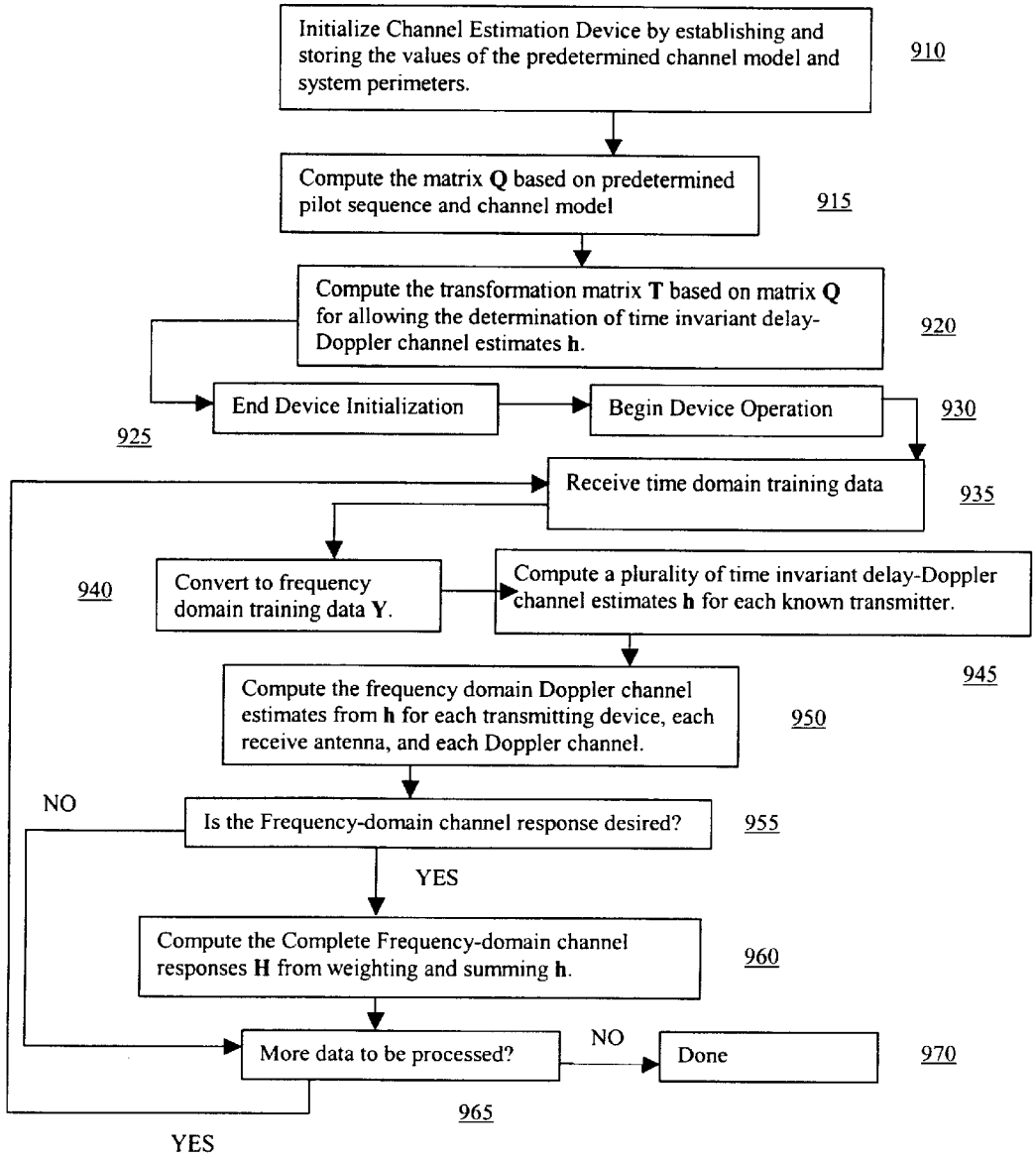
FIG. 9 is a flow chart representation of a second embodiment of the method performed by the Channel Estimation Device of FIG. 2 in accordance with the present invention in the second embodiment in which null cyclic prefixes are not employed.

FIG. 9 shows a flow chart that illustrates the steps performed by the Channel Estimation Device (208) in accordance with the present invention in the second embodiment in which null cyclic prefixes are not employed. The first step, block 910, is to initialize Channel Estimation Device (208) of the device of FIG. 2 by establishing and storing the values of the pilot sequences that are assigned to the transmitting devices, the number of Doppler taps $V_T$ and the number of Delay taps L in the channel model, the system DFT size (N for data blocks, $N_p$ for pilot blocks), and the Doppler DFT size ($N_k$). Next, in block 915, process the matrix X (a first matrix) based on predetermined pilot sequence from block 910, and the delay Doppler channel parameters h' into the uncorrupted received array data Y', according to Y'=Xh', in accordance with the delay-Doppler channel model. X is computed based on the pilot sequences that are assigned to the transmitting devices, the number of Doppler taps and the number of delay taps in the channel model, the system DFT size, and the Doppler DFT size.

Next, in block 920, compute the transformation matrix D (a second matrix) that transforms the received data matrix Y' into a set of delay-Doppler channel parameters h' according to h'=DY' such that h' minimizes the expression $|Xh'-Y'|^2$. In a preferred embodiment, the transformation matrix D is computed according to $D=(X^H X)^{-1} X^H$. Flow proceeds to block 925, wherein the device is finished with the steps required to initialize the channel estimation device. Next, in block 930, normal operating mode commences, and the device proceeds to block 935, wherein the receiver receives data over an information burst and passes the data along to block 940 to be collected and converted into a matrix of received training data Y. Next, in block 945, compute the delay-Doppler channel estimates h for each desired transmitter at each antenna output by multiplying the matrix of received data by the transformation matrix: h=DY. Next, in block 950, using the equation $$H_{m,u,v}(k) = \sum_{n=0}^{L-1} h_{m,u,v}(n) e^{-j2\pi kn/N}$$

compute the estimated frequency domain channel estimates for each transmitting device, for each receive antenna, and each Doppler channel by taking the DFT of the delay-spread taps that correspond to the transmitting device, the receiving antenna, and the Doppler channel being considered. This equation is defined where N is the DFT size, k is the subcarrier number, and $h^{m,u,v}(n)$ is user u's $v^{th}$ Doppler channel tap on antenna m at time n. In single carrier, N=K, whereas in OFDM, N is chosen to be greater than K because the channel at subcarrier k=1 is not highly correlated with the channel at subcarrier k=K. A different $H_{m,u,v}(k)$ is found on each antenna for user u and then stacked in the vector $H_{u,v}(k)$ to get the steering vector at subcarrier k for Doppler channel v. Proceed to block 955 and determine if this is the complete Frequency-domain channel response desired.

Then, in a preferred embodiment, in block 960, using the formula $$H_u(k, n) = \sum_{v=-V}^{+V} H_{u,v}(k) e^{j2\pi v n/N_k},$$

compute the Complete Frequency-domain channel responses by weighting and summing the corresponding frequency domain channel estimates for each transmitting device, each receive antenna, and each Doppler channel. If desired, the time-domain channel estimate, $h_u(l,n)$, can be found for all times by parameterizing it by $V_T$ time invariant channels, $h_{u,v}(t)$ referred to as Doppler channels, and $$h_u(l, n) = \sum_{v=-V}^{+V} h_{u,v}(l) e^{j2\pi v n/N_k}.$$

Next block 965 asks is there more data to be processed? If yes, proceed to block 1435. If no, the process has been completed, (block 970).

Figure 10:
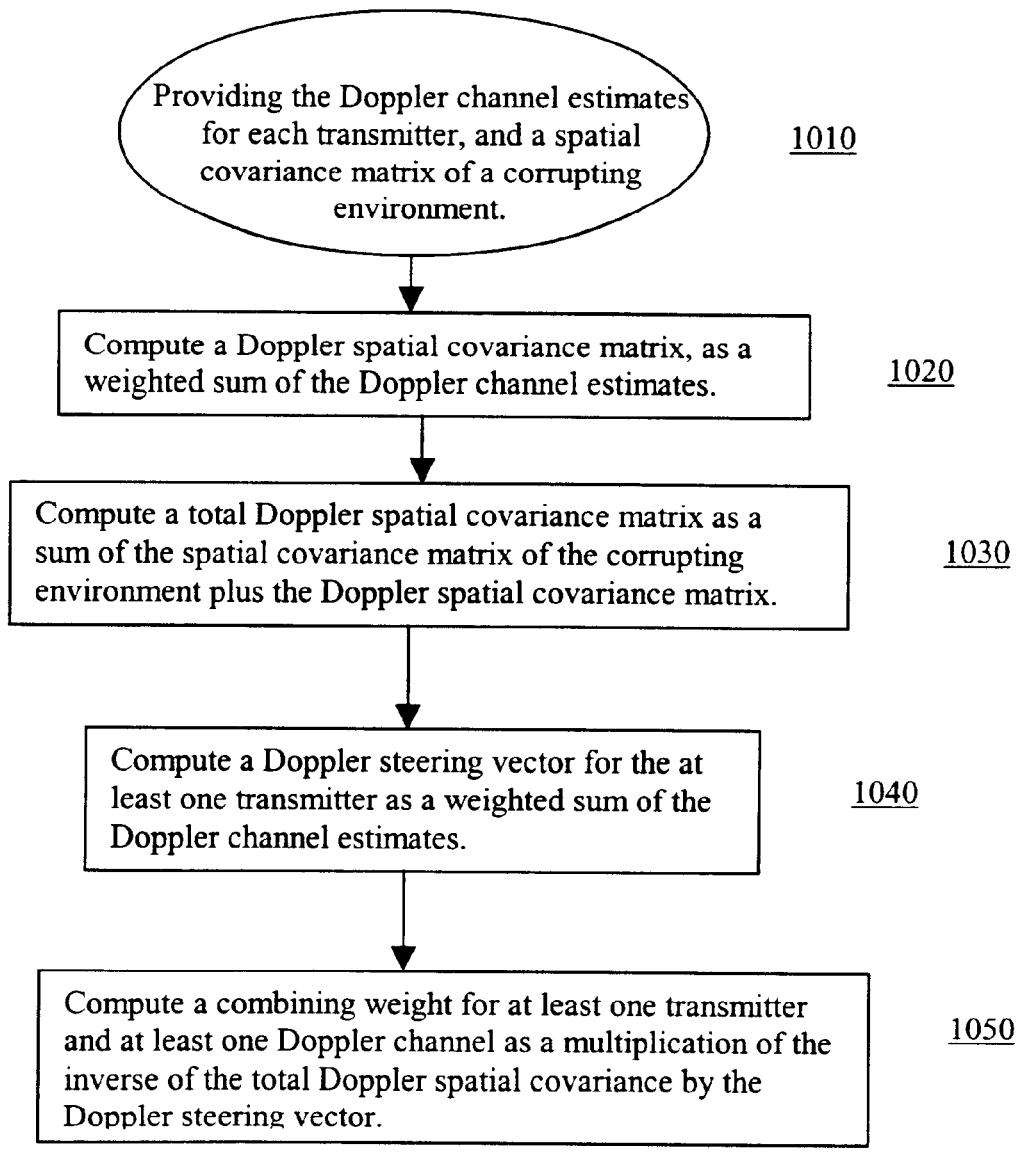
FIG. 10 is a flow chart representation of one embodiment of the method performed by the device of FIG. 2 for computing combining weights in accordance with the present invention.

FIG. 10 is a flow chart representation of steps of a method performed by a preferred embodiment of the Combiner Controller Device (210) of FIG. 2 to compute the combining weight vector for known noise and interference for the case where a null cyclic prefix is included with the pilot blocks and the data blocks. The method of combining weights for null-cyclic prefix communication systems is described as follows: The presence of a null cyclic prefix forces a cyclic prefix property on the Doppler signals of the desired users. This property causes no ICI in the frequency domain among the different Doppler signals for the desired users.

Using each user's Doppler channel estimates of the previous discussion, the method and device of the present invention computes MMSE combining weights, referred to as MMSE Doppler combining weights. In addition, because there are $V_T$ Doppler channels, a different set of combining weights are computed to minimize the mean squared error between the combined output and user u's $v^{th}$ frequency-domain Doppler signal.

$$\min_{w_{u,v}(k,b)} E|w_{u,v}^H(k, b)Y(k, b) - Z_{u,v}(k, b)|^2 \quad (32)$$

The solution is:

$$w_{u,v}(k,b) = (R(k,b) + \sigma_n^2 I)^{-1} p^{u,v}(k,b) \quad (33)$$

where $\sigma_n^2$ is the frequency-domain noise power and:

$$R(k, b) = \sum_{u=1}^{U} \sum_{v=-V}^{V} \sum_{w=-V}^{V} H_{u,v}(k) H_{u,w}^H(k) \alpha_b(v - w) \quad (34)$$

-continued $$P_{u,v}(k, b) = \sum_{w=-V}^{V} H_{u,w}(k) \alpha_b(w - v) \quad (35)$$

$$\alpha_b(v) = e^{j\pi v(K-1+2n_b)/N_k} \frac{\sin(\pi v K/N_k)}{\sin(\pi v/N_k)} \quad (36)$$

The time-domain symbol estimates for user u on Doppler channel v are given as (recall that the last $L_{CP}$ symbols are the null cyclic postfix):

$$\hat{x}_{u,v}(n, b) = \left( \frac{1}{N} \sum_{k=0}^{N-1} w_{u,v}^H(k, b) Y(k, b) e^{j2\pi k n/N} \right) \quad (37)$$

$$e^{-j2\pi v(n+n_b)/N_k}$$

Now we have symbol estimates for each Doppler channel that the invention combines to get the symbol estimates, which are called the Combined MMSE Doppler combining weights. In a preferred embodiment, the weights are combined in such a way as to weight each output based on the power in their respective Doppler channels. In another preferred embodiment, an alternative set of weights is computed that decode the DC (i.e., v=0) Doppler channel only and are called the DC MMSE Doppler weights. The second type of combining weights first estimates the unknown interference plus noise signal vector, $x_c(k,p)$ at each pilot block p by subtracting out the estimated contribution of the known signals from the received pilots at each antenna. The estimated unknown interference plus noise signal found at the pilots is then used to find an average unknown interference plus noise spatial correlation matrix, $R_c(k,b)$:

$$R_c(k,b) = \text{average}(x_c(k,p) x_c^H(k,p))$$

Note that there is potentially a different $R_c(k,b)$ at every subcarrier k and data block b. However, $R_c(k,b)$ will in practice be fixed on blocks of subcarriers and data blocks. For example, in one preferred embodiment, $R_c(k,b)$ is averaged over four subcarriers of the pilot block (this will correspond to 32 subcarriers of the data block) and over all four pilots blocks in time.

The MMSE weights for user u that equalize and suppress unknown interference in a null-cyclic prefix communication system are found by solving the following equation:

$$\min_{w_{u,v}(k,b)} E \left| w_{u,v}^H(k, b) \sum_{j=1}^{U} \sum_{w=-V}^{V} H_{j,w}(k) Z_{j,w}(k) + w_{u,v}^H(k, b) x_c(k, b) - X_{u,v}(k) \right|^2$$

The solution to this equation is given as:

$$w_{u,v}(k,b) = (R(k,b) + R_c(k,b))^{-1} p_{u,v}(k,b)$$

Using the preceding methodology, block 1010, provides the Doppler channel estimates for each transmitter, and a spatial covariance matrix of a corrupting environment. The Doppler channel estimates, $H_{u,v}(k)$, ... for v=−V ... +V at each subcarrier of interest for each desired transmitter u=1 ... U at each antenna output. The spatial covariance matrix of the corrupting environment, $R_c$, may also be computed. Next, in block 1020, compute the Doppler spatial covariance matrix, R(k,b) is computed at each subcarrier and time block of interest as a weighted sum of the Doppler channel estimates at the corresponding subcarrier:

$$R(k, b) = \sum_{u=1}^{U} \sum_{v=-V}^{V} \sum_{w=-V}^{V} H_{u,v}(k) H_{u,w}^{H}(k) \alpha_b(v - w)$$

where in the preferred embodiment:

$$\alpha_b(v) = e^{j\pi v(K-1+2n_b)/N_k} \frac{\sin(\pi v K / N_k)}{\sin(\pi v / N_k)}.$$

Block 1030, which computes an estimate of the total Doppler spatial covariance matrix, $R_T(k,b)$ is computed as the sum of the noise spatial covariance matrix of the corrupting environment, plus the Doppler spatial covariance matrix: $R_T(k,b)=R(k,b)+R_c$. Next, in block 1040, the Doppler steering vector $p_{u,v}(k,b)$, is computed for at least one transmitter as a weighted sum of the Doppler channel estimates using the equation $$p_{u,v}(k, b) = \sum_{w=-V}^{V} H_{u,w}(k) \alpha_b(w - v).$$

Finally, in block 1050, combing weight vector for the $v^{th}$ Doppler channel for desired transmitter u at each subcarrier and time block, $w_{u,v}(k,b)$, by multiplying the inverse of the total Doppler spatial covariance matrix estimate at that subcarrier and time block by the $v^{th}$ composite Doppler channel, $p_{u,v}(k,b)$, of the desired transmitter at that same subcarrier and time block:

$$w_{u,v}(k,b)=(R_T(k,b))^{-1} p_{u,v}(k,b)$$

Figure 11:
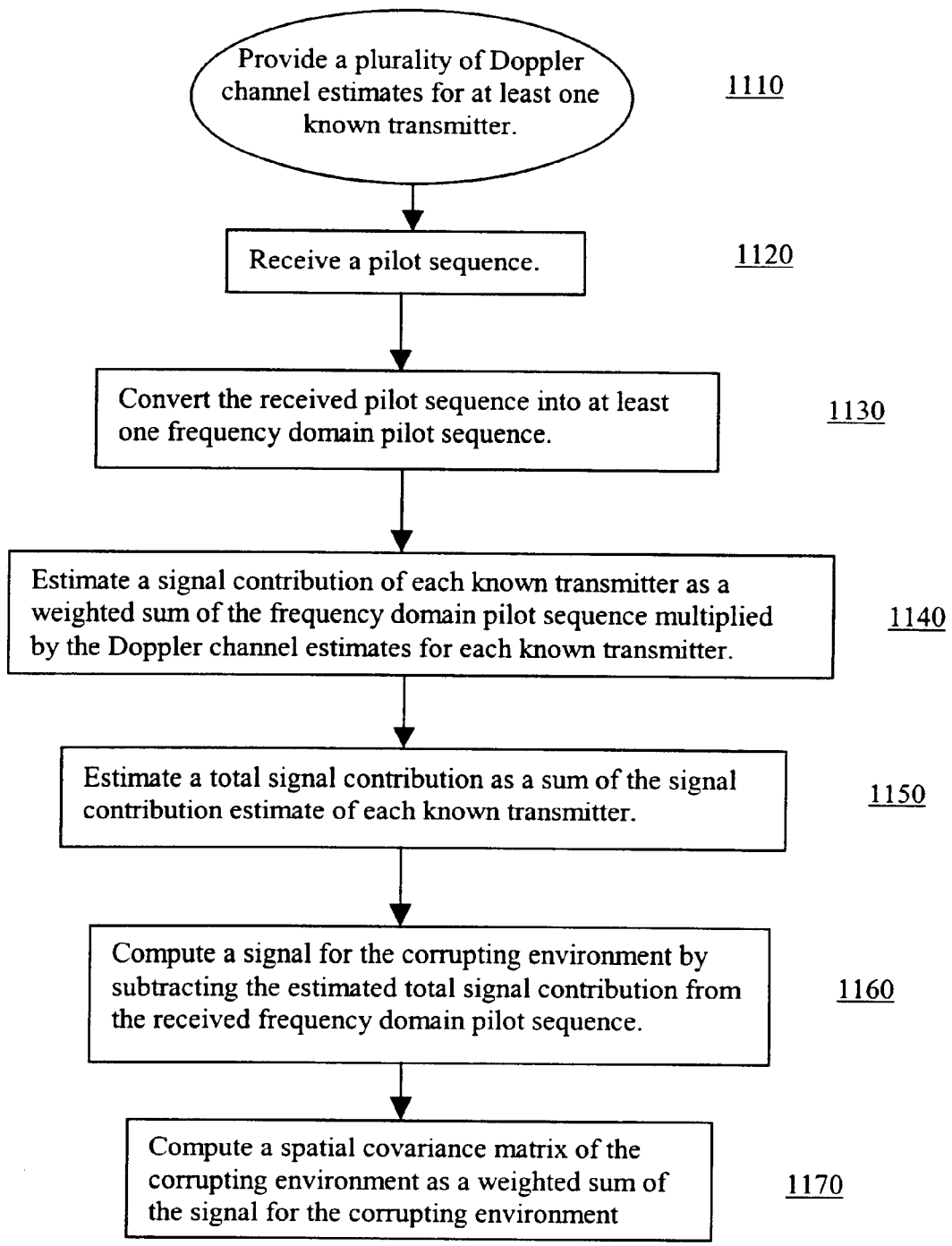
FIG. 11 is a flow chart representation of one embodiment of the method performed by the device of FIG. 2 for computing a spatial covariance matrix of the corrupting environment in accordance with the present invention.

FIG. 11 is a flow chart representation of steps of a method performed by a preferred embodiment of the Device (200) of FIG. 2 to compute a spatial covariance matrix of the corrupting environment as a weighted sum of the signal for the corrupting environment. Block 1110 provides a plurality of Doppler channel estimates for at least one known transmitter. Next, in block 1120 a pilot sequence is received. Next in block 1130, the received pilot sequence is converted into at least one frequency domain pilot sequence. At block 1140, a signal contribution of each known transmitter is estimated as a weighted sum of the frequency domain pilot Doppler signals multiplied by the Doppler channel estimates $H_{u,v}(k)$, for v=−V . . . +V at each subcarrier of interest for each desired transmitter u=1 . . . U at each antenna output. Next in block 1150, a total signal contribution is estimated as a sum of the signal contribution estimate of each known transmitter. To estimate the external interference plus noise signal, $x_c$ (k,b) at the pilot symbols by subtracting the estimated contribution of each desired transmitter from the received signal at each subcarrier and time that there is a pilot symbol:

$$x_c(k, b) = Y(k, b) - \sum_{u=1}^{U} \sum_{v=-V}^{+V} H_{u,v}(k) Z_{u,v}(k, b).$$

To estimate the interference plus noise spatial covariance matrix at each subcarrier and time, $R_c(k,b)$, by averaging the unknown interference plus noise signal over some set of subcarriers and times: $R_c(k,b)$=average$\{x_c(k,b)\}$. This flows to block 1160, which computes a signal for the corrupting environment by subtracting the estimated total signal contribution from the received frequency domain pilot sequence. Finally in block 1170, a spatial covariance matrix of the corrupting environment $R_c(k,b)$, as a weighted sum of the signal for the corrupting environment.

Figure 12:
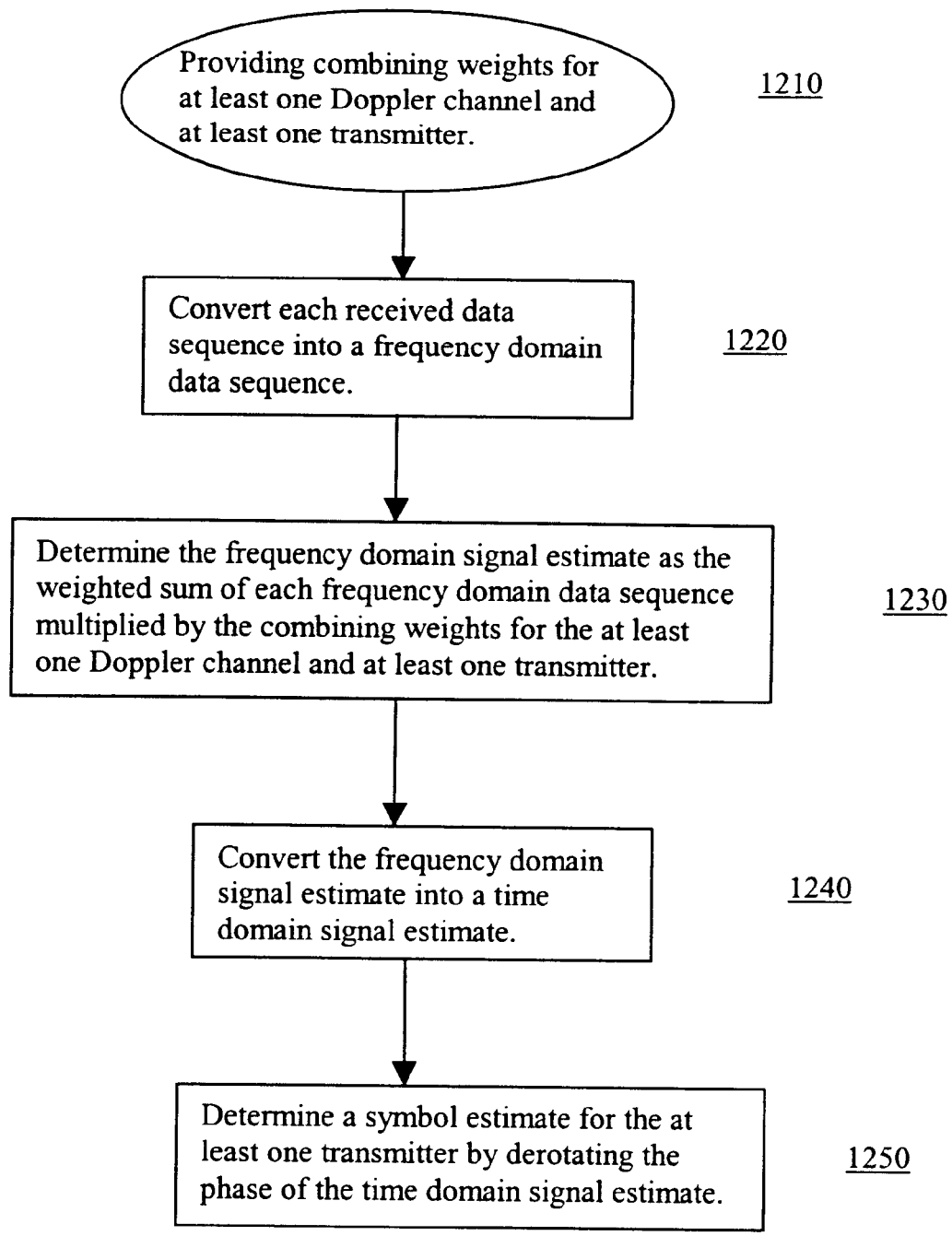
FIG. 12 is a flow chart representation of one embodiment of the method performed by the device of FIG. 2 for determining a symbol estimate for at least one transmitter in accordance with the present invention.

FIG. 12 is a flow chart representation of steps to determine a symbol estimate for the at least one transmitter by de-rotating the phase of the time-domain Doppler signal estimate. Block 1210 begins by accessing the provided combining weights for at least one Doppler channel and at least one transmitter. Next, with block 1220, convert each received data sequence into a frequency domain data sequence. This flows to block 1230, which determines the frequency domain signal estimate as the weighted sum of each frequency domain data sequence multiplied by the combining weights for the at least one Doppler channel and at least one transmitter. This is done by computing the frequency-domain combined signal for the desired transmitter u and Doppler channel v, on each subcarrier on time block b, $\hat{X}_{u,v}(k,b)$, as a weighted sum of the equalizing weight vector for the $v^{th}$ Doppler channel for desired transmitter u at the same subcarrier and time block, $w_{u,v}(k,b)$ times the received data vector at the same subcarrier and time, Y(k,b): $\hat{X}_{u,v}(k,b)=w_{u,v}^{H}(k,b)Y(k,b)$. Next in block 1240, convert the frequency domain signal estimate into a time domain signal estimate by computing the time-domain combined signal for desired transmitter u and Doppler channel v at each time, n, on time block b, $\hat{x}_{u,v}(n,b)$, as the inverse DFT or the IFFT of $$\hat{X}_{u,v}(k, b) : \hat{x}_{u,v}(n, b) = \frac{1}{N} \sum_{k=0}^{N-1} \hat{X}_{u,v}(k, b) e^{j2\pi kn/N}.$$

Finally, block 1250 determines a symbol estimate for the at least one transmitter by de-rotating the phase of the time domain signal estimate. In other words, estimate the transmitted time-domain symbols for desired transmitter u, $\hat{x}_u(n, b)$, as the time-domain combined signal for desired transmitter u and Doppler channel v at each time, n, on time block b, $\hat{x}_{u,v}(n,b)$, multiplied by the conjugate of the $v^{th}$. Doppler sinusoid on time block b, $e^{-j2\pi v(n+n_b)/N_k}$: $\hat{x}_u(n, b)=\hat{x}_{u,v}(n, b)e^{-2\pi v(n+n_b)/N_k}$.

Figure 13:
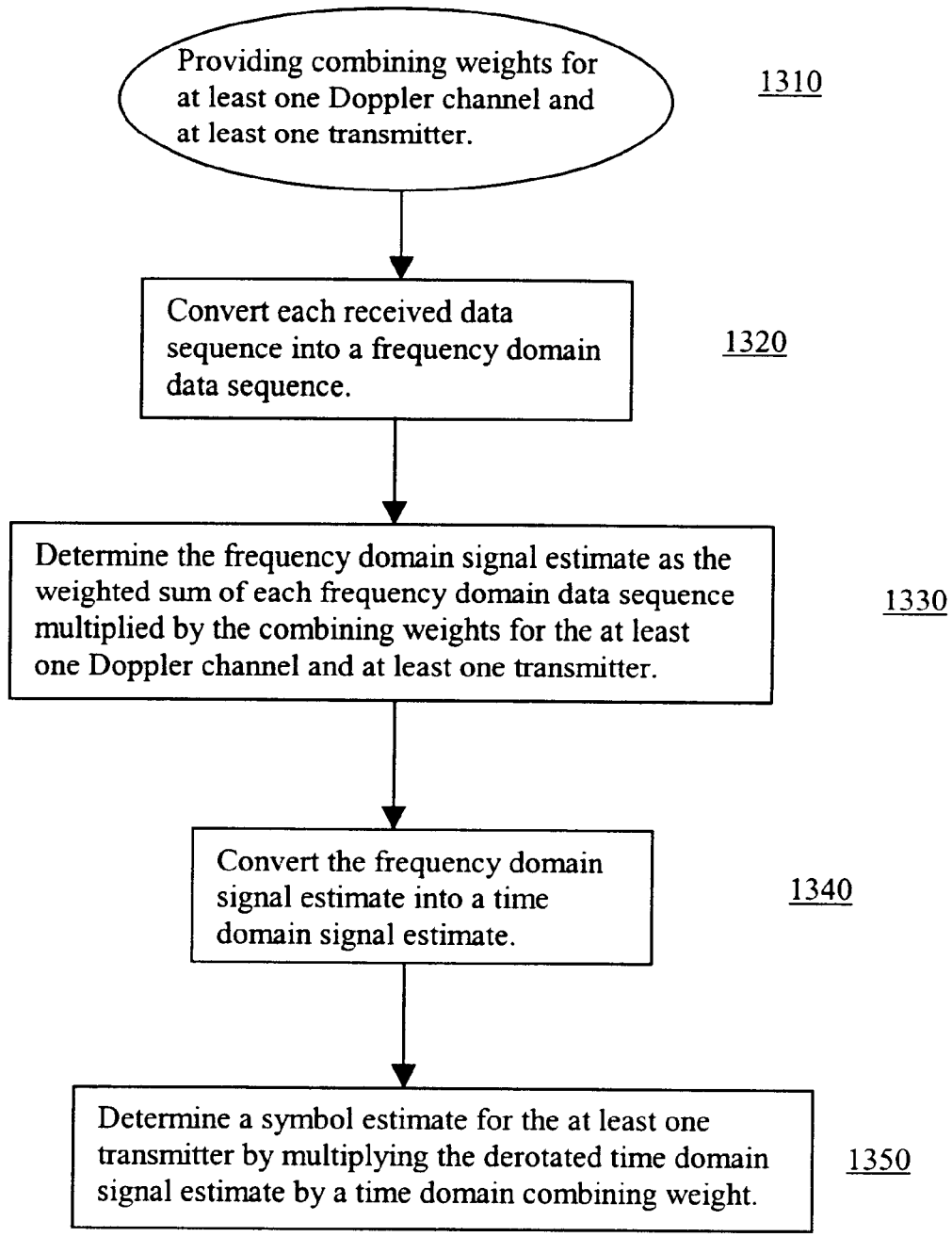
FIG. 13 is a flow chart representation of a second embodiment of the method performed by the device of FIG. 2 for determining a symbol estimate for at least one transmitter in accordance with the present invention.

FIG. 13 is a flow chart representation of steps to find the time-domain symbol estimates by combining the frequency-domain symbol estimates for the plurality of Doppler channels. Block 1310 starts by accessing the provided combining weights for at least one Doppler channel and at least one transmitter.

Next, with block 1320, convert each received data sequence into a frequency domain data sequence. This flows to block 1330, which determines the frequency domain signal estimate as the weighted sum of each frequency domain data sequence multiplied by the combining weights for the at least one Doppler channel and at least one transmitter. Next in block 1340, convert the frequency domain signal estimate into a time domain signal estimate. Finally, block 1350, determine a symbol estimate for the at least one transmitter by weighting and summing the de-rotated time domain signal estimate by a time domain combining weights. This may be done by estimating the transmitted time-domain symbols for desired transmitter u, $\hat{x}_u(n,b)$, as a linear combination, $\beta(v)$ of the time-domain combined signal for desired transmitter u and Doppler channel v at each time, n, on time block b, $\hat{x}_{u,v}$ (n b), multiplied by the conjugate of the $v^{th}$ Doppler sinusoid on time block b, $e^{-j2\pi v(n+n_b)/N_k}$:

$$\hat{x}_u(n, b) = \sum_{v=-V}^{+V} \beta(v)\hat{x}_{u,v}(n, b)e^{-j2\pi v(n+n_b)/N_k}$$

Figure 14:
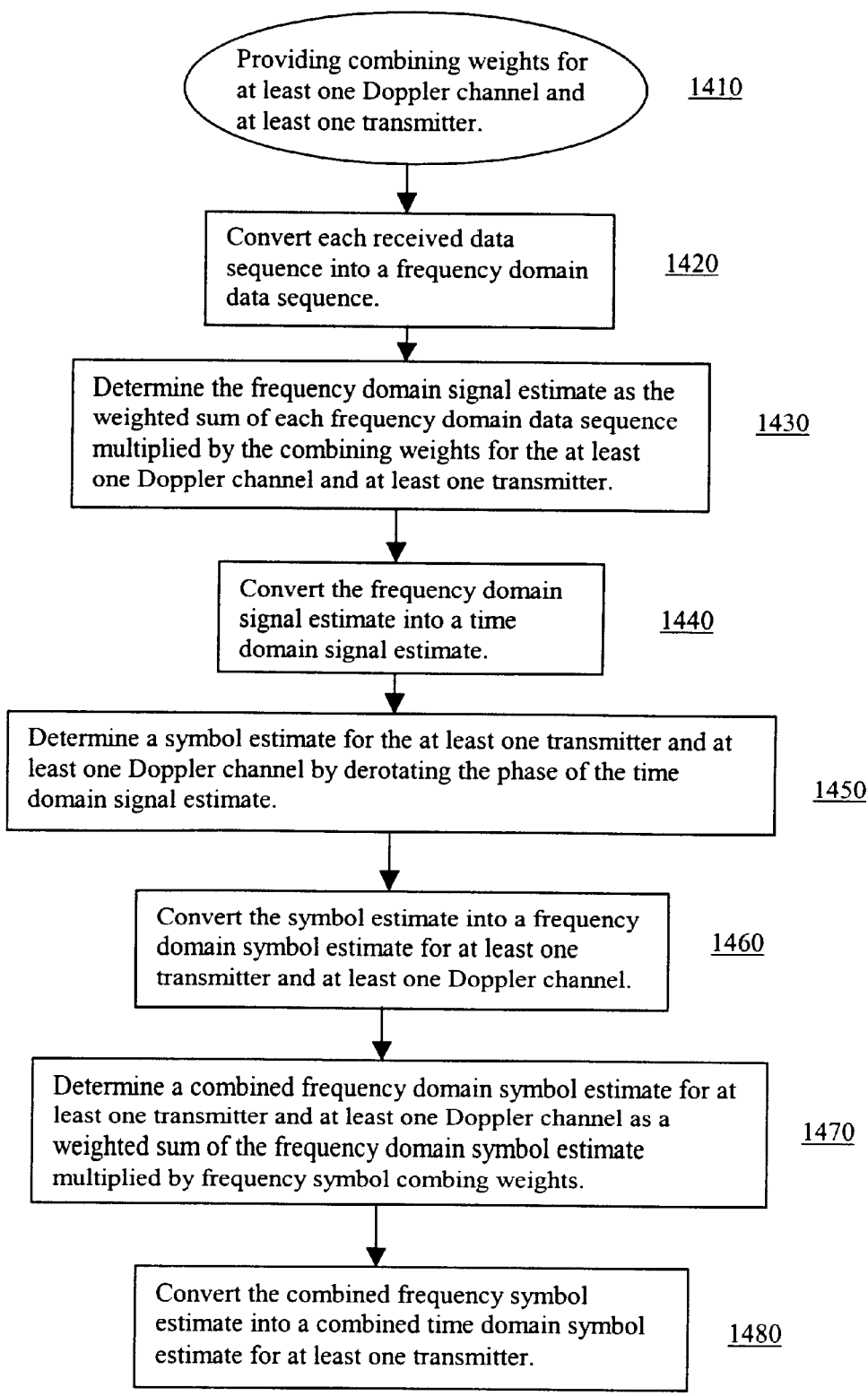
FIG. 14 is a flow chart representation of a second embodiment of the method performed by the device of FIG. 2 for determining a combined time domain symbol estimate for at least one transmitter in accordance with the present invention.

FIG. 14 is a flow chart representation of the method performed by the Combiner Controller Device of FIG. 2 to find the time-domain symbol estimates by combining the frequency-domain symbol estimates for the plurality of Doppler channels. Using the methodology stated for FIG. 12, block 1410 starts by accessing the provided combining weights for at least one Doppler channel and at least one transmitter. Next, with block 1420, convert each received data sequence into a frequency domain data sequence. In block 1430, the frequency domain signal estimate is determined as the weighted sum of each frequency domain data sequence multiplied by the combining weights for the at least one Doppler channel and at least one transmitter. Next in block 1440, convert the frequency domain signal estimate into a time domain signal estimate. In block 1450, a symbol estimate for the at least one transmitter and the at least one Doppler channel is determined by de-rotating the phase of the time domain signal estimate. Next, block 1460; convert the symbol estimate into a frequency domain symbol estimate for at least one transmitter and at least one Doppler channel. Then in block 1470, estimate the transmitted frequency-domain symbols for desired transmitter u, $\hat{X}_u(k, b)$, as a linear combination, $\beta(k,v)$ of the DFT or FFT of the time-domain combined signal for desired transmitter u and Doppler channel v at each time, n, on time block b, $\hat{x}_{u,v}(n,b)$, multiplied by the conjugate of the $v^{th}$ Doppler sinusoid on time block b, $e^{-j2\pi v(n+n_b)/N_k}$:

$$\hat{X}_u(k, b) = \sum_{v=-V}^{+V} \beta(k, v)\sum_{n=0}^{N-1} \hat{x}_{u,v}(n, b)e^{-j2\pi v(n+n_b)/N_k}e^{-j2\pi kn/N}.$$

This will determine a combined frequency domain symbol estimate for at least one transmitter as a weighted sum of the frequency domain symbol estimate multiplied by frequency symbol combining weights. Finally in block 1480, the combined frequency-domain symbol estimate for at least one transmitter is converted into a combined time domain symbol estimate for at least one transmitter by estimating the transmitted time-domain symbols for desired transmitter u, $\hat{x}_u(n,b)$, as the inverse DFT or the IFFT of $$\hat{X}_u(k, b) : \hat{x}_u(n, b) = \frac{1}{N}\sum_{k=0}^{N-1} \hat{X}_u(k, b)e^{j2\pi kn/N}.$$

The present invention may be embodied in other specific forms without departing from its spirit or essential characteristics. The described embodiments are to be considered in all respects only as illustrative and not restrictive.

We claim:

1. A method of operating a communication system including at least one receiver comprising:
   receiving a predetermined pilot sequence;
   converting the received pilot sequence into at least one frequency domain pilot sequence;
   determining a plurality of time invariant Doppler channel estimates from the frequency domain pilot sequence; and
   estimating a time-varying channel based on the Doppler channel estimates.

2. The method of claim 1 wherein the time invariant channel estimates are computed according to:

$$\min_{\substack{h_{m,\varepsilon,v}(n) \\ l=1,\ldots,U \\ n=0,\ldots,L-1}} \sum_{l=1}^{N_k} \sum_{\substack{b\neq 1 \\ h\in f_b}} \left| \sum_{u=1}^{U} \sum_{v=-V}^{V} Z_{u,v}(k, b) \sum_{n=0}^{L-1} h_{m,u,v}(n)e^{-j2\pi kn/N} - Y_m(k, b) \right|^2.$$

3. The method of claim 1 wherein the time invariant channel estimates are computed according to $$h_m = (Q^H Q)^{-1} Q^H \Psi_m$$

wherein:

$$\Psi_m = \begin{bmatrix} Y_m(\Gamma_{1,min}, 1) \\ \vdots \\ Y_m(\Gamma_{1,max}, 1) \\ Y_m(\Gamma_{2,min}, 2) \\ \vdots \\ Y_m(\Gamma_{2,max}, 2) \\ \vdots \\ Y_m(\Gamma_{N_b,min}, N_b) \\ \vdots \\ Y_m(\Gamma_{N_b,max}, N_b) \end{bmatrix} \quad Q = \begin{bmatrix} q^H(\Gamma_{1,min})X(\Gamma_{1,min}, 1) \\ \vdots \\ q^H(\Gamma_{1,max})X(\Gamma_{1,max}, 1) \\ q^H(\Gamma_{2,min})X(\Gamma_{2,min}, 2) \\ \vdots \\ q^H(\Gamma_{2,max})X(\Gamma_{2,max}, 2) \\ \vdots \\ q^H(\Gamma_{N_b,min})X(\Gamma_{N_b,min}, N_b) \\ \vdots \\ q^H(\Gamma_{N_b,max})X(\Gamma_{N_b,max}, N_b) \end{bmatrix}$$

$$q(k) = \begin{bmatrix} f(k) \\ f(k) \\ \vdots \\ f(k) \end{bmatrix} UV_T f(k)'s, \quad f(k) = \begin{bmatrix} 1 \\ e^{j2\pi k/N} \\ \vdots \\ e^{j2\pi(l-1)k/N} \end{bmatrix}$$

$$X(k, b) = diag\{Z_{1,-V}(k, b)1^T, \ldots, Z_{1,V}(k, b)1^T, Z_{2,-V}(k, b)1^T, \ldots,$$
$$Z_{2,V}(k, b)1^T, \ldots, Z_{U,-V}(k, b)1^T, \ldots, Z_{U,V}(k, b)1^T\}.$$

4. The method of claim 1 wherein the time invariant channel estimates are computed according to $$h = (X^H X)^{-1} X^H Y$$

wherein;

$$Y = \begin{bmatrix} Y^T(\Gamma_{1,min}, 1) \\ \vdots \\ Y^T(\Gamma_{1,max}, 1) \\ \vdots \\ Y^T(\Gamma_{N_b,min}, N_b) \\ \vdots \\ Y^T(\Gamma_{N_b,max}, N_b) \end{bmatrix} \quad X = \begin{bmatrix} x^T_{\Gamma_{1,min},1} \\ \vdots \\ x^T_{\Gamma_{1,max},1} \\ \vdots \\ x^T_{\Gamma_{N_b,min},N_b} \\ \vdots \\ x^T_{\Gamma_{N_b,max},N_b} \end{bmatrix}$$

$$x_{i,k,b} = \begin{bmatrix} Z_{i,-V}(k,b,0) \\ \vdots \\ Z_{i,-V}(k,b,L-1) \\ \vdots \\ Z_{i,+V}(k,b,0) \\ \vdots \\ Z_{i,+V}(k,b,L-1) \end{bmatrix} \quad H_1 = \begin{bmatrix} h_{i,-V}^T(0) \\ \vdots \\ h_{i,-V}^T(L-1) \\ \vdots \\ h_{i,+V}^T(0) \\ \vdots \\ h_{i,+V}^T(L-1) \end{bmatrix}$$

$$x_{k,b} = \begin{bmatrix} x_{1,k,b} \\ \vdots \\ x_{U,k,b} \end{bmatrix} \quad h = \begin{bmatrix} H_1 \\ \vdots \\ H_J \end{bmatrix}$$

$$Z_{i,v}(k,b,l) = \sum_{m=0}^{N-1} z_{t,v}(m-l,b)e^{-j2\pi km/N}$$

$$z_{l,v}(m,b) = x_1(m,b)e^{j2\pi v(m+m_b)/N_k}.$$

5. The method of claim 1 further comprising:

determining a time variant channel estimate from the time invariant channel estimates.

6. The method of claim 5 wherein the time variant channel estimates are computed according to:

$$H_u(k,n) = \sum_{v=-V}^{+V} H_{u,v}(k)e^{j2\pi vn/N_k}.$$

7. The method of claim 5 wherein the time variant channel estimates are computed according to:

$$h(l,n) = \sum_{v=-V}^{+V} h_v(n)e^{-j2\pi vl/N_k} e^{j2\pi vt/N_k}.$$

8. The method of claim 5 wherein the time variant channel estimates are computed according to:

$$h(l,n) \approx \sum_{v=-V}^{+V} h_v(n)e^{j2\pi vh/N_k}.$$

9. The method of claim 1 further comprising, initializing a channel estimation device of the receiver.

10. The method of claim 9 wherein the channel estimation device is initialized by establishing and storing each predetermined pilot sequence assigned to each transmitter, and predetermined channel model system parameters.

11. The method of claim 9 further comprising:

computing a first matrix based on the predetermined pilot sequence and the predetermined channel model system parameter.

12. The method of claim 11 further comprising computing a second matrix based on the first matrix for allowing determination of the time invariant channel estimates.

13. The method of claim 12 wherein the first matrix is computed according to:

$$X = \begin{bmatrix} x_{\Gamma_{1,\min},1}^T \\ \vdots \\ x_{\Gamma_{1,\max},1}^T \\ \vdots \\ x_{\Gamma_{N_b,\min},N_b}^T \\ \vdots \\ x_{\Gamma_{N_b,\max},N_b}^T \end{bmatrix} \quad \text{wherein: } x_{i,k,b} = \begin{bmatrix} Z_{i,-V}(k,b,0) \\ \vdots \\ Z_{i,-V}(k,b,L-1) \\ \vdots \\ Z_{i,+V}(k,b,0) \\ \vdots \\ Z_{i,+V}(k,b,L-1) \end{bmatrix}$$

$$x_{k,b} = \begin{bmatrix} x_{1,k,b} \\ \vdots \\ x_{U,k,b} \end{bmatrix}$$

and the second matrix is computed according to:

$$D = (X^H X)^{-1} X^H.$$

14. The method of claim 12 wherein the first matrix is computed according to:

$$Q = \begin{bmatrix} q^H(\Gamma_{1,\min})X(\Gamma_{1,\min},1) \\ \vdots \\ q^H(\Gamma_{1,\max})X(\Gamma_{1,\max},1) \\ q^H(\Gamma_{2,\min})X(\Gamma_{2,\min},2) \\ \vdots \\ q^H(\Gamma_{2,\max})X(\Gamma_{2,\max},2) \\ \vdots \\ q^H(\Gamma_{N_b,\min})X(\Gamma_{N_b,\min},N_b) \\ \vdots \\ q^H(\Gamma_{N_b,\max})X(\Gamma_{N_b,\max},N_b) \end{bmatrix}$$

and the second matrix is computed according to:

$$T = (Q^H Q)^{-1} Q^H.$$

15. The method of claim 1 wherein the received pilot sequence includes a null cyclic prefix.

16. A method of determining channel estimation between a transmitting device and a receiving device comprising;

initializing a channel estimation device by establishing and storing values of a predetermined pilot sequence and channel model;

computing a matrix Q based on the predetermined pilot sequence and channel model;

computing a transformation matrix T based on matrix Q for allowing the determination of time invariant delay-Doppler channel estimates h;

receiving a training data including a null cyclic prefix;

converting the training data including the null cyclic prefix to frequency domain training data Y;

computing a plurality of time invariant delay-Doppler channel estimates h for each known transmitter;

computing a frequency domain Doppler channel estimate from h for each transmitting device, each receiving antenna, and each Doppler channel; and computing a complete Frequency-domain channel response H, from weighting and summing h.

17. A receiver for a communication system comprising:
means for receiving a pilot sequence;
means for converting the received pilot sequence into at least one frequency domain pilot sequence; and
means for determining a plurality of time invariant Doppler channel estimates from the frequency domain pilot sequence; and
means for estimating a time-varying channel based on the Doppler channel estimates.

18. The receiver of claim 17 further comprising:
means for determining a time variant channel estimate from the time invariant channel estimates.

19. The receiver of claim 17 wherein the received pilot sequence includes a null cyclic prefix.

20. A receiving device for a wireless communication system comprising;
at least one antenna;
a receiving unit in communication with the antenna;
at least one antenna combiner in communication with the receiving unit;
at least one combiner controller in communication with the receiving unit, the combiner controller in communication with a antenna combiner;
at least one channel estimation device in communication with the receiving unit;
at least one pilot symbol generator in communication with the combiner controller which uses information provided by the pilot symbol generator to control the antenna combiner, the pilot symbol generator in communication with the channel estimation device;
at least one information decoding unit in communication with the antenna combiner for generating data information received by the antenna; and
wherein the channel estimation device utilizes information from the pilot symbol generator and the receiving unit to determine a frequency domain time varying channel estimation by employing a null cyclic prefix to estimate time varying frequency responses of a transmitting device.

21. The receiver of claim 20 wherein the combiner controller computes a combining weight vector for known noise and interference where a null cyclic prefix is included with pilot blocks and data blocks.

22. The receiver of claim 20 wherein the combiner controller computes a spatial covariance matrix of the a computing environment as a weighted sum of a signal for the corrupting environment.

23. The receiver of claim 20 wherein the combiner controller determines a symbol estimate for at least one transmitter by de-rotating the phase of a time domain Doppler signal estimate.

24. The receiver of claim 20 wherein the combiner controller computes a combining weight vector for known noise and interference where a null cyclic prefix is included with pilot blocks and data blocks, the combiner controller computes a spatial covariance matrix of the a corrupting environment as a weighted sum of a signal for the corrupting environment, the combiner controller determines a symbol estimate for at least one transmitter by de-rotating the phase of a time domain Doppler signal estimate.

25. A computer readable medium storing a computer program comprising:
computer readable program code for receiving a pilot sequence;
computer readable program code for converting the received pilot sequence into at least one frequency domain pilot sequence;
computer readable program code for determining a plurality of time invariant Doppler channel estimates from the frequency domain pilot sequence; and
computer readable program code for estimating a time-varying channel based on the Doppler channel estimates.

26. The program of claim 25 further comprising:
computer readable program code for determining a time variant channel estimate from the time invariant channel estimates.

27. The program of claim 25 wherein the pilot sequence includes a null cyclic prefix.

28. A method of operating a communication system including at least one receiver comprising:
providing combining weights for at least one Doppler channel and at least one transmitter;
receiving at least one data sequence;
converting each received data sequence into a frequency domain data sequence;
determining a frequency domain signal estimate as the weighted sum of each frequency domain data sequence multiplied by the combining weights for the at least one Doppler channel and the at least one transmitter;
converting the frequency domain signal estimate into a time domain signal estimate; and
determining a symbol estimate for the at least one transmitter by de-rotating a phase of the time domain signal estimate.

29. The method of claim 28 wherein the symbol estimate for the at least one transmitter is computed according to:

$$\hat{x}_{u,v}(n, b) = \left(\frac{1}{N}\sum_{k=0}^{N-1} w_{u,v}^H(k, b)Y(k, b)e^{-j2\pi kn/N}\right)e^{-j2\pi v(n+n_b)/N_b}.$$

30. The method of claim 28 wherein the data sequence includes a null cyclic prefix.

31. The method of claim 28 wherein the symbol estimate for the at least one transmitter and at least one Doppler channel is determined by multiplying the de-rotated time domain signal estimate for at least one transmitter and at least one Doppler channel by a time domain combining weight.

32. The method of claim 28 wherein the symbol estimate for the at least one transmitter and at least one Doppler channel is determined by $$\hat{x}_u(n, b) = \sum_{v=-V}^{+V} \beta(v)\hat{x}_{u,v}(n, b)e^{-j2\pi v(n+n_b)/N_k}$$

wherein:

$$\hat{x}_{u,v}(n, b) = \left(\frac{1}{N}\sum_{k=0}^{N-1} w_{u,v}^H(k, b)Y(k, b)e^{j2\pi kn/N}\right)e^{-j2\pi v(n+n_b)/N_b}$$

and β(v) is the time-domain combining weight.

33. The method of claim 29 further comprising:
converting the symbol estimate for at least one transmitter and at least one Doppler channel into a frequency domain symbol estimate for at least one transmitter and at least one Doppler channel;
determining a combined frequency domain symbol estimate for at least one transmitter and at least one Doppler channel as a weighted sum of the frequency domain symbol estimate multiplied by frequency symbol combining weights; and converting the combined frequency symbol estimate into a combined time domain symbol estimate for at least one transmitter.

34. The method of claim 33 wherein the combined frequency domain symbol estimate for at least one transmitter and at least one Doppler channel $$\hat{X}_u(k, b) = \sum_{v=-V}^{+V} \beta(k, v) \sum_{n=0}^{N-1} \hat{x}_{u,v}(n, b) e^{-j2\pi v(n+n_b)/N_k} e^{-j2\pi k n/N}$$

and $\beta(k,v)$ is the frequency-domain combining weight.

35. The method of claim 33 wherein the combined time domain symbol estimate for at least one transmitter is computed according to:

$$\hat{x}_u(n, b) = \frac{1}{N} \sum_{k=0}^{N-1} \hat{X}_u(k, b) e^{j2\pi k n/N}.$$

36. A receiver for a communication system comprising:
means for receiving at least one data sequence;
means for converting each received data sequence into a frequency domain data sequence;
means for determining a frequency domain signal estimate as the weighted sum of each frequency domain data sequence multiplied by combining weights for the at least one Doppler channel and the at least one transmitter;
means for converting the frequency domain signal estimate into a time domain signal estimate; and
means for determining a symbol estimate for the at least one transmitter by de-rotating a phase of the time domain signal estimate.

37. The receiver of claim 36 therein the symbol estimate for the at least one transmitter and at least one Doppler channel is determined by multiplying the de-rotated time domain signal estimate for at least one transmitter and at least one Doppler channel by a time domain combining weight.

38. The receiver of claim 36 further comprising:
means for converting the symbol estimate for at least one transmitter and at least one Doppler channel into a frequency domain symbol estimate for at least one transmitter and at least one Doppler channel;
means for determining a combined frequency domain symbol estimate for at least one transmitter and at least one Doppler channel as a weighted sum of the frequency domain symbol estimate multiplied by frequency symbol combining weights; and
means for converting the combined frequency symbol estimate into a combined time domain symbol estimate for at least one transmitter.

39. The receiver of claim 36 wherein the data sequence includes a null cyclic prefix.

40. A computer usable medium storing a program comprising:
computer readable program code for receiving at least one data sequence;
computer readable program code for converting each received data sequence into a frequency domain data sequence;
computer readable program code for determining a frequency domain signal estimate as the weighted sum of each frequency domain data sequence multiplied by combining weights for the at least one Doppler channel and the at least one transmitter;
computer readable program code for converting the frequency domain signal estimate into a time domain signal estimate; and
computer readable for determining a symbol estimate for the at least one transmitter by de-rotating a phase of the time domain signal estimate.

41. The program of claim 40 wherein the symbol estimate for the at least one transmitter and at least one Doppler channel is determined by multiplying the de-rotated time domain signal estimate for at least one transmitter and at least one Doppler channel by a time domain combining weight.

42. The program of claim 40 further comprising:
computer readable program code for converting the symbol estimate for at least one transmitter and at least one Doppler channel into a frequency domain symbol estimate for at least one transmitter and at least one Doppler channel;
computer readable program code for determining a combined frequency domain symbol estimate for at least one transmitter and at least one Doppler channel as a weighted sum of the frequency domain symbol estimate multiplied by frequency symbol combining weights; and
computer readable program code for converting the combined frequency symbol estimate into a combined time domain symbol estimate for at least one transmitter.

43. The program of claim 40 wherein the data sequence includes a null cyclic prefix.

44. A method of operating a communication system including at least one receiver comprising:
providing to the receiver Doppler channel estimates for at least one transmitter, and a spatial covariance matrix of a corrupting environment;
computing a Doppler spatial covariance matrix as a weighted sum of the Doppler channel estimates;
computing a total Doppler spatial covariance matrix as a sum of the spatial covariance matrix of the corrupting environment;
computing a Doppler steering vector for at least one transmitter as a weighted sun of the Doppler channel estimates; and
computing a combining weight for the at least one transmitter and at least one Doppler channel as a function of the total Doppler spatial covariance and the Doppler steering vector.

45. The method of claim 44 wherein the combining weight for the at least one transmitter is computed according to:

$$\min_{w_{u,v}(k,b)} E \left| w_{u,v}^H(k, b) \sum_{j=1}^{U} \sum_{w=-V}^{V} H_{j,w}(k) Z_{j,w}(k) + w_{u,v}^H(k, b) x_c(k, b) - X_{u,v}(k) \right|^2.$$

46. The method of claim 44 wherein the combining weight for the at least one transmitter is computed by solving the following minimization:

$$\min_{w_{u,v}(k,\,b)} = E|w_{u,v}^H(k,b)Y(k,b) - Z_{u,v}(k,b)|^2$$

$$w_{u,v}(k,b) = (R(k,b) + \sigma_n^2 I)^{-1} p_{u,v}(k,b).$$

$$w_{u,v}(k,b) = (R(k,b)+\sigma_n^2 I)^{-1} p_{u,v}(k,b)$$

where $\sigma_n^2$ is the frequency-domain noise power.

47. The method of claim 44 wherein the combining weight for the at least one transmitter is computed according to:

$$w_{u,v}(k,b) = (R(k,b)+R_c(k,b))^{-1} p^{u,v}(k,b)$$

wherein:

$$R(k,b) = \sum_{u=1}^{U} \sum_{v=-V}^{V} \sum_{w=-V}^{V} H_{w,v}(k) H_{u,w}^H(k)\alpha_b(v-w)$$

$$\alpha_b(v) = e^{jv(K-1+2N_b)/N_k} \frac{\sin(\pi v K/N_k)}{\sin(\pi v/N_k)}$$

$$P_{u,v}(k,b) = \sum_{w=-V}^{V} H_{u,w}(k)\alpha_b(w-v).$$

48. A receiver for a communication system comprising:
means for computing a Doppler spatial covariance matrix as a weighted sum of Doppler channel estimates;
means for computing a total Doppler spatial covariance matrix as a sum of a spatial covariance matrix of a computing environment;
means for computing a Doppler steering vector for at least one transmitter as a weighted sum of Doppler channel estimates for at least one transmitter; and
means for computing a combining weight for the at least one transmitter and at least one Doppler channel as a function of the total Doppler spatial covariance and the Doppler steering vector.

49. A computer usable medium storing a computer program comprising:
computer readable program code for computing a Doppler spatial covariance matrix as a weighted sum of Doppler channel estimates;
computer readable program code for computing a total Doppler spatial covariance matrix as a sum of a spatial covariance matrix of a corrupting environment;
computer readable program code for computing a Doppler steering vector for at least one transmitter as a weighted sum of Doppler channel estimates for at least one transmitter; and
computer readable program code for computing a combining weight for the at least one transmitter and at least one Doppler channel as a function of the total Doppler spatial covariance and the Doppler steering vector.

50. A method of operating a communication system including at least one receiver comprising:
providing a plurality of Doppler channel estimates for at least one known transmitter;
receiving a pilot sequence;
converting the received pilot sequence into at least one frequency domain pilot sequence;
estimating a signal contribution of each known transmitter as a weighted sum of the frequency domain pilot sequence multiplied by the Doppler channel estimates for each known transmitter;
estimating a total signal contribution as a sum of the signal contribution estimate of each known transmitter;
computing a signal for the corrupting environment by subtracting the estimated total signal contribution from the received frequency domain pilot sequence; and
computing a spatial covariance matrix of the corrupting environment as a weighted sum of the signal for the corrupting environment.

51. The method of claim 50 wherein signal for the corrupting environment is computed according to:

$$x_c(k,b) = Y(k,b) - \sum_{u=1}^{U} \sum_{v=-V}^{+V} H_{u,v}(k) Z_{u,v}(k,b).$$

a spatial covariance matrix of the corrupting environment is computed according to $$R_c(k,b) = \text{average } \{x_c(k,b)\}.$$

52. A receiver for a communication system comprising:
means for receiving a pilot sequence;
means for converting the received pilot sequence into at least one frequency domain pilot sequence;
means for estimating a signal contribution of each known transmitter as a weighted sum of the frequency domain pilot sequence multiplied by Doppler channel estimates for each known transmitter;
means for estimating a total signal contribution as a sum of the signal contribution estimate of each known transmitter;
means for computing a signal for the corrupting environment by subtracting the estimated total signal contribution from the received frequency domain pilot sequence;
means for computing a spatial covariance matrix of the corrupting environment as a weighted sum of the signal for the corrupting environment.

53. A computer usable median storing a program comprising:
computer readable program code for receiving a pilot sequence;
computer readable program code for converting the received pilot sequence into at least one frequency domain pilot sequence;
computer readable program code for estimating a signal contribution of each known transmitter as a weighted sum of the frequency domain pilot sequence multiplied by Doppler channel estimates for each known transmitter;
computer readable program code for estimating a total signal contribution as a sum of the signal contribution estimate of each known transmitter;
computer readable program code for computing a signal for the corrupting environment by subtracting the estimated total signal contribution from the received frequency domain pilot sequence; and
computer readable program code for computing a spatial covariance matrix of the corrupting environment as a weighted sum of the signal for the corrupting environment.

* * * * *